United States Patent
Cloonan et al.

(10) Patent No.: US 9,960,840 B2
(45) Date of Patent: May 1, 2018

(54) INTRA-CHASSIS PROTECTION SYSTEMS AND METHODS FOR PASSIVE OPTICAL NETWORK OPTICAL LINE TERMINALS

(71) Applicant: ARRIS Enterprises, Inc., Suwanee, GA (US)

(72) Inventors: Thomas J. Cloonan, Lisle, IL (US); David B. Bowler, Stow, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days. days.

(21) Appl. No.: 14/486,412

(22) Filed: Sep. 15, 2014

(65) Prior Publication Data

US 2016/0080074 A1 Mar. 17, 2016

(51) Int. Cl.
*H04B 10/03* (2013.01)
*H04J 14/02* (2006.01)
*H04Q 11/00* (2006.01)

(52) U.S. Cl.
CPC .......... *H04B 10/03* (2013.01); *H04J 14/0297* (2013.01); *H04Q 2011/0043* (2013.01)

(58) Field of Classification Search
CPC .. H04B 10/03–10/032; H04Q 11/0005; H04Q 2011/0043; H04J 14/0287–14/0297
See application file for complete search history.

(56) References Cited

U.S. PATENT DOCUMENTS

| | | | | |
|---|---|---|---|---|
| 5,241,610 A | * | 8/1993 | Labiche | H04Q 11/0005 385/16 |
| 8,611,740 B2 | | 12/2013 | Grossman et al. | |
| 8,615,169 B2 | | 12/2013 | Mie et al. | |
| 2002/0177333 A1 | * | 11/2002 | van Doorn | H05K 1/181 439/70 |
| 2006/0059290 A1 | * | 3/2006 | McKeown | G06F 13/4068 710/305 |
| 2010/0098407 A1 | * | 4/2010 | Goswami | H04B 10/032 398/5 |

OTHER PUBLICATIONS http://www.merriam-webster.com/dictionary/disconnect.*

* cited by examiner

*Primary Examiner* — David Payne
*Assistant Examiner* — Casey Kretzer
(74) *Attorney, Agent, or Firm* — Thomas A. Ward

(57) ABSTRACT

An optical line terminal is operable in a passive optical network. The optical line terminal includes a chassis. A plurality of optical subsystems are disposed within the chassis. Each optical subsystem is operable to generate optical signals for delivery to a port. Each optical subsystem includes one or more optical switches. When a fault condition is detected at a first optical subsystem preventing the delivery of first optical signals generated by the first optical subsystem to the port of the first optical subsystem, the optical switches switch to deliver second downstream optical signals generated by a second optical subsystem to the port of the first optical subsystem.

12 Claims, 30 Drawing Sheets

INTRA-CHASSIS PROTECTION SYSTEMS AND METHODS FOR PASSIVE OPTICAL NETWORK OPTICAL LINE TERMINALS

BACKGROUND

Technical Field

This disclosure relates generally to passive optical networks, and more particularly to hardware failure protection in passive optical networks.

Background Art

Passive optical networks are data delivery networks that transmit data in high volume across optical fibers. The networks are referred to as "passive" in that they use un-powered optical splitters to facilitate data delivery to multiple clients from a single fiber. An optical network unit is a device in a passive optical network that serves multiple users. Illustrating by example, an optical network unit may serve the occupants of an office building. Each end user employs an optical network terminal to receive data from the passive optical network. Operators of passive optical networks deliver Internet access, television, and telephone services using passive optical networks configured in "fiber to the premises" and/or "fiber to the home" architectures. Passive optical networks are ideal for these applications because data delivery across these networks is fast, cost effective, and scalable.

In a passive optical network, an optical line terminal resides at one end of the network, while an end unit resides at the other. In a network operator's hardware infrastructure, an optical line terminal receives electrical signals from service providers, the Internet, etc., converts those signals to optical signals, and delivers the optical signals to end units disposed across the network. Each optical network unit then receives these signals. Packet encryption ensures that each optical network unit receives the proper data. Upstream communication to the optical line terminal is then multiplexed across the single fiber.

Hardware and software faults can occur in components within a passive optical network system. For network operators, network reliability is an issue of concern, as a single failure in the network could result in significant network downtime, frustration among customers, and a significant loss of revenue. Exacerbating this concern is the fact that troubleshooting hardware failures is complicated and time consuming. To properly determine where the failure is, a network operator may need to inspect multiple optical line terminals, optical splitters, fibers, and/or optical network units in what may be a complex optical network topology. Surviving the failures and continuing to provide service to passive optical network subscribers is desirable.

BRIEF DESCRIPTION OF THE DRAWINGS

For the purpose of illustrating embodiments described below, there are shown in the drawings example constructions of the embodiments; however, the embodiments are not limited to the specific methods and instrumentalities disclosed. In the drawings.

Figure 1:
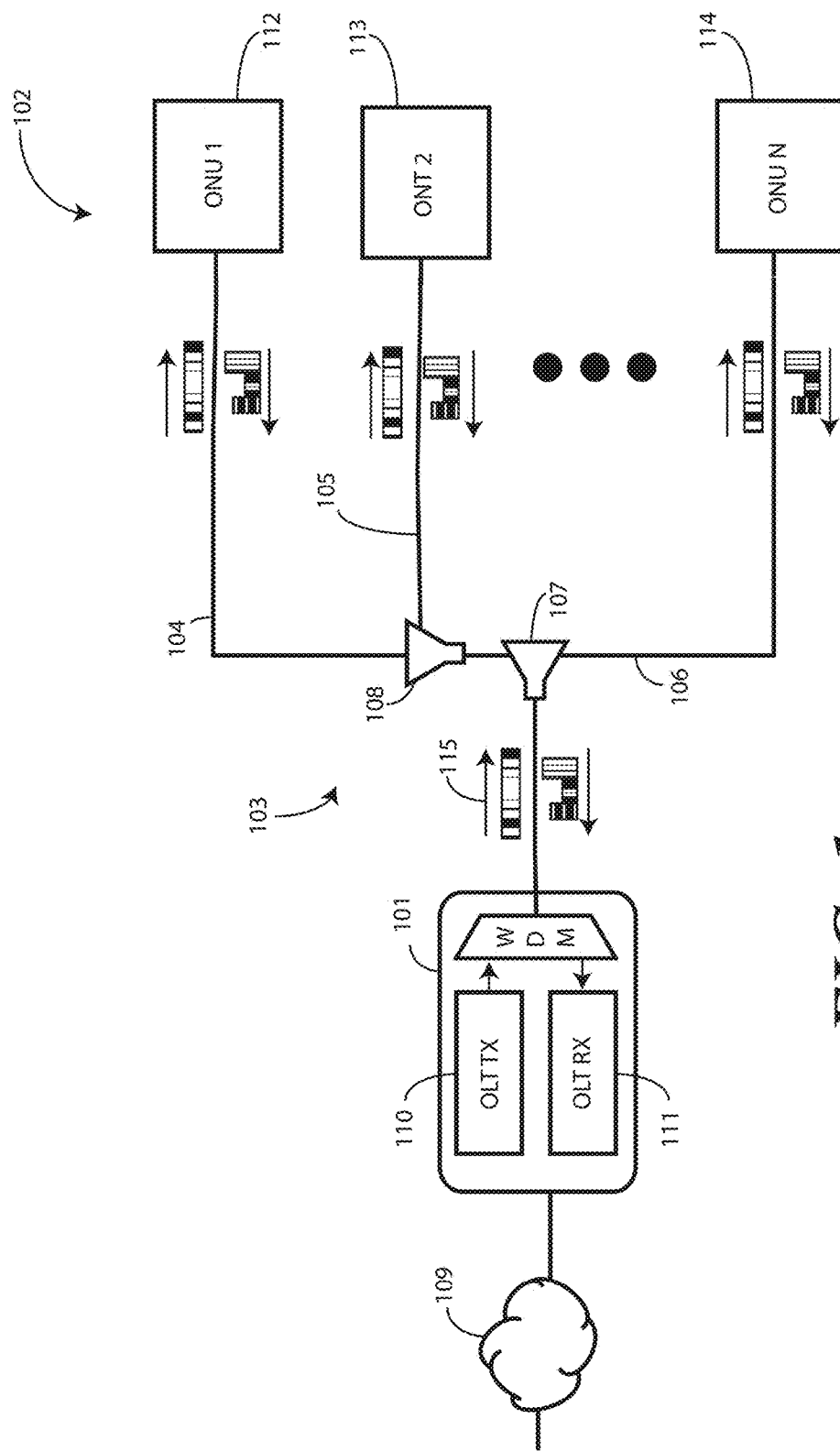
FIG. 1 illustrates a schematic block diagram of a passive optical network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to optical subsystems, circuit cards, and other components disposed within an optical line terminal of a passive optical network. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling optical subsystems in an optical line terminal to switch one or more optical switches when a fault condition is detected to route optical signals from a second card through a terminal of a first card as described herein. The non-processor processor circuits may include, but are not limited to, electrical signal to optical signal converters, photodiode receivers, lasers, microprocessors, memory devices, clock circuits, power source circuits, and user input devices. As such, these functions may be interpreted as steps of a method to perform selective steering of optical signals with integrated optical switches disposed in a passive optical network optical line terminal from a service circuit card to a passive optical network system, or alternatively from a spare circuit card to the same passive optical network system whenever a hardware or software fault is detected on the service circuit card. Alternatively, some or all functions could be implemented by a state machine that has no stored program instructions, or in one or more application specific integrated circuits, in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and circuit components with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an optical line terminal that is suitable for use in a passive optical network. In one embodiment, the optical line terminal includes a chassis. A plurality of optical subsystems is disposed within the chassis. The optical subsystems can be disposed on a single circuit card, multiple circuit cards, or on individual circuit cards. In one embodiment, each optical subsystem is disposed on one of a packet forwarding module circuit card, a photonic integrated circuit card, or combinations thereof. For example, a single optical subsystem can be disposed on one or both of a packet forwarding module circuit card or a photonic integrated circuit card. In other embodiments, multiple optical subsystems can be disposed on one or more circuit cards.

In one embodiment, each optical subsystem is operable to generate downstream optical signals for delivery to downstream devices, such as optical line terminals, through an optical port. Each optical subsystem is also operable to receive upstream optical signals from downstream devices through the port. For example, each optical subsystem can include one or more lasers and a photodetector to send and receive optical signals.

In one embodiment, each optical subsystem also includes one or more optical switches. Advantageously, when a fault condition—such as a faulty hardware component or a software failure—is detected at a first optical subsystem, and this fault condition prevents either the delivery of downstream optical signals or the receipt of upstream optical signals, the one or more optical switches can switch to selectively steer optical signals from a spare optical subsystem and/or a neighboring (or adjacent) optical subsystem to the circuit cards affected by the fault condition. Said differently, in one embodiment the one or more optical switches are to, when a fault condition is detected at a first optical subsystem preventing the delivery of first downstream optical signals generated by the first optical subsystem to the port of the first optical subsystem, switch to deliver second downstream optical signals generated by a second optical subsystem to the port of the first optical subsystem.

Illustrating by example, assume an optical line terminal configured in accordance with one or more embodiments of the disclosure includes ten packet forwarding module circuit card/photonic integrated circuit card combinations, each having one optical subsystem disposed thereon. Presume that these ten optical subsystems are arranged in a numbered series from one to ten. Now assume that there is also a spare optical subsystem to selectively generate spare downstream optical signals disposed in the chassis as well.

If there is a fault condition occurring in, say, optical subsystem eight, this fault condition may prevent either the delivery of downstream optical signals or the receipt of upstream optical signals at the port of optical subsystem eight. Advantageously, in one embodiment when this occurs, the one or more optical switches can switch to deliver optical signals from another optical subsystem to the port of the faulty module. In one embodiment, this other optical subsystem is an adjacent optical subsystem, such as optical subsystem seven. In another embodiment, this other optical subsystem is the spare optical subsystem. Accordingly, service to the optical line terminal being served by the port of optical subsystem eight is only momentarily interrupted—if interrupted at all.

The immediate question to be asked is this: if optical subsystem seven is delivering its optical signals to optical subsystem eight, what is servicing the port of optical subsystem seven? In one embodiment, the switching of the optical switches not only cause another optical subsystem to service the port of optical subsystem eight, but also—when the fault condition is detected—switch to deliver the spare downstream optical signals to at least one optical subsystem of the plurality of optical subsystems. For example, in one embodiment, the spare optical signals of the spare optical subsystem are delivered to optical subsystem one. At this point, all optical subsystems below optical subsystem eight provide "spare optical signals for the next higher neighbor." Accordingly, the spare optical subsystem provides optical signals for optical subsystem one, optical subsystem one provides optical signals for optical subsystem two, and so forth, to the point where optical subsystem seven provides optical signals for optical subsystem eight. (Optical subsystems nine and ten operate normally since they are above the fault.) Advantageously, the faulty condition has been automatically obviated by the one or more optical switches. (In another embodiment, the optical signals from the spare optical subsystem can be delivered to optical subsystem eight directly.)

Thus, to summarize this example, in one embodiment the plurality of optical subsystems comprises N optical subsystems (N being ten in the previous example). In one embodiment, these optical subsystems are arranged in a series from one to N. Embodiments of the disclosure contemplate that a fault, be it hardware or software, can occur on an Mth optical subsystem where M is a value between one and N, inclusive (M was eight in the previous example). Where this occurs and is detected, the one or more optical switches of the optical subsystems can switch to cause optical subsystems one to M−1 to each deliver downstream optical signals generated thereon to another optical subsystem. In the example above, the other optical subsystem was the next higher, adjacent optical subsystem such that each optical subsystem from one to M−1 provided signals that served as "a spare for the guy to the right." As will be shown in the discussion of FIGS. 34-36 below, in other embodiments, the one or more optical switches switch to deliver the spare downstream optical signals directly to optical subsystem M.

By way of background, turning now to FIG. 1, illustrated therein is a portion of a passive optical network 100. This illustrative passive optical network 100 includes an optical line terminal 101 and a number of optical network units 102 disposed near end users. The passive optical network 100 provides network access over "the last mile" to the end user. In one embodiment, the passive optical network is a point-to-multi-point network comprised of an optical line terminal 101 at the central office, an optical distribution network 103, and a plurality of optical network units 102 at the customer premises. The optical distribution network 103 can include various fibers 104,105,106 and/or optical splitters 107,108.

The optical line terminal 101 is a device that serves as the service provider endpoint of the passive optical network 100. The optical line terminal 101 may be any device that is configured to communicate with the optical network units 102 and one or more networks 109 external to the passive optical network 100. An optical line terminal 101 provides the interface between a passive optical network 100 and a service provider's core network 109, such as an IP interface over Fast Ethernet, Gigabit Ethernet, or 10-Gigabit Ethernet.

The optical line terminal 101 may act as an intermediary between the other network 109 and the optical network units 102. For instance, the optical line terminal 101 may forward data received from the network 109 to the optical network units 102, and forward data received from the optical network units 102 onto the other network 109. Although the specific configuration of the optical line terminal 101 may vary depending on the type of passive optical network 100, the optical line terminal 101 may comprise a transmitter 110 and a receiver 111. In one embodiment, the optical line terminal 101 is located at a central location, such as a central office. However, the optical line terminal 101 may be located at other locations as well.

In one or more embodiments, the optical line terminal 101 can perform conversion between the electrical signals used by the service provider's equipment and the fiber optic signals used by the passive optical network 100. The optical line terminal 101 can also coordinate the multiplexing between any data conversion devices disposed along the optical distribution network 103.

The optical network units 102 terminate the passive optical network 100 and present customer interfaces to the user. In one embodiment, each optical network unit 112,114 is a device that transforms incoming optical signals into electronics at a customer's premises. This transformation provides Internet, television, or other telecommunications services to each customer. These services can include voice (plain old telephone service (POTS) or voice over IP (VoIP)), data (typically Ethernet or V.35), video, and/or telemetry (TTL, ECL, RS530, etc.). The optical network units 102 can be devices that terminate any one of the endpoints of a fiber to the premises network, implement a passive optical network protocol, and/or adapt passive optical network signals to subscriber service interfaces. In some contexts, an optical network unit 112,114 comprises a multiple subscriber device. An optical network terminal 113 is a special case of an optical network unit that serves a single subscriber.

In multiple-tenant units, the optical network unit 112,114 may be bridged to a customer premises device within the individual dwelling unit using technologies such as Ethernet over twisted pair, G.hn (a high-speed ITU-T standard that can operate over any existing home wiring—power lines, phone lines and coaxial cables) or DSL. Some optical network units 102 implement a separate subscriber unit to provide services such as telephony, Ethernet data, or video.

In one embodiment, the optical network units 102 may be any device that is configured to communicate with the optical line terminal 101 and a customer or user (not shown). Specifically, the optical network units 102 may act as an intermediary between the optical line terminal 101 and the customer. For instance, the optical network units 102 may forward data received from the optical line terminal 101 to the customer, and forward data received from the customer onto the optical line terminal 101.

Although the specific configuration of the optical network units 102 may vary depending on the type of passive optical network 100, the optical network units 102 may comprise an optical transmitter configured to send optical signals to the optical line terminal 101. Additionally, the optical network units 102 may comprise an optical receiver configured to receive optical signals from the optical line terminal 101 and a converter that converts the optical signal into electrical signals for the customer, such as signals in the ATM or Ethernet protocol. The optical network units 102 may also comprise a second transmitter and/or receiver that may send and/or receive the electrical signals to a customer device. In some embodiments, optical network units 102 and optical network terminals 113 are similar, and thus the terms are used interchangeably herein. The optical network units 102 are typically located at distributed locations, such as the customer premises, but may be located at other locations as well.

The passive optical network 100 can be a shared network, in that the optical line terminal sends a single stream 115 of downstream traffic that is seen by all optical network units 102. Each optical network unit only reads the content of those packets that are addressed to it. Encryption is used to prevent eavesdropping on downstream traffic.

In one embodiment, the optical line terminal 101 is constructed as a chassis-based router that steers packets to the correct fiber that may be shared by multiple passive optical network optical network unit subscribers. A typical passive optical network optical line terminal chassis is often comprised of multiple circuit cards. Passive optical network optical line terminal systems are usually multi-card chassis with multiple passive optical network blades. Each passive optical network blade can include multiple passive optical network feed connectors. The circuit cards may be network cards that connect to a Wide Area Network of Fiber cards that have one or more fiber ports connecting to passive optical network optical network units.

Since passive optical networks 100 are used for both commercial and residential services, it is likely that system operators may wish to offer a cost-effective, high-availability service to their customers. However, as noted above, hardware and software faults can occur. Such faults can occur anywhere in the passive optical network 100.

Prior art techniques for dealing with these hardware and software faults suffer from problems. To begin, most prior art techniques for dealing with system faults are directed solely to the issue of cut fibers. Service providers may, for example, provide multiple parallel fibers between the optical line terminal 101 and the optical network units 102. This defeats the purpose of service multiple customers with a single fiber and increases cost. By contrast, embodiments of the disclosure contemplate that hardware and software faults can frequently occur in the passive optical network optical line terminal circuit cards. These faults can include software problems, e.g., memory faults, or hardware faults with circuit card devices. Prior art preventative techniques focusing only on hardware faults occurring in the fibers are unable to fix faults occurring in the cards of the chassis of optical line terminal devices. Embodiments of the disclosure contemplate that fiber cuts are less likely to occur than are hardware and software faults within the chassis itself.

Second, the prior art techniques for solving fault issues frequently require managing external cabling systems that use splitters and combiners to combine fibers. This is labor intensive, costly, and cumbersome. Third, the use of splitters and combiners tends to lead to optical losses that consume optical link budget. These optical losses limit the length the passive optical network 100 can cover between the optical line terminal 101 and the optical network units 102. Fourth, the prior art techniques tend to require expensive 1+1 sparing instead of more cost-effective N+1 sparing provided by embodiments of the disclosure. In view of these various issues, embodiments of the disclosure become highly desirable. To wit, it is desirable that passive optical networks have various mechanisms to ensure that operations continue even in the presence of system faults for maintaining high availability of services to consumers. It is to this end that the embodiments described below are directed.

Specifically, embodiments of the disclosure advantageously provide protection against hardware or software faults occurring in the chassis of an optical line terminal while only requiring one fiber to couple the optical line terminal and the optical network units. This "hardware/software fault prevention without redundant fibers" reduces fiber cost and network overhead. Moreover, while embodiments of the disclosure advantageously work in single fiber networks, where multiple fibers couple the optical line terminal to the optical network units, embodiments of the disclosure can be used to circumvent fiber cuts as well.

In one or more embodiments, the fault prevention techniques described below provide protection against hardware or software failures that occur in the active data plane and/or processing circuitry disposed within the optical line terminal chassis itself. Embodiments of the disclosure contemplate that components within the chassis can have relatively high failure rates due to processor failures or memory leaks. Embodiments of the disclosure contemplate that these faults can occur more frequently than do fiber cuts. Accordingly, embodiments of the disclosure advantageously provide automatic mechanisms to overcome such faults while reducing—or eliminating—the complications of having optical combining or switching components disposed outside the chassis itself. Additionally, embodiments of the disclosure minimize optical loss in the system by using optical switches to overcome faults instead of lossy splitters and combiners.

The figures that follow illustrate multiple use cases and instantiations of embodiments of the disclosure. Still others will be obvious to those of ordinary skill in the art having the benefit of this disclosure. At a high level, embodiments of the disclosure employ strategic optical switch arrangements within the optical line terminal chassis to preferentially steer optical signals from "spare" subsystems into a communication path of an optical signal that has been generated by an adjacent optical subsystem. Similarly, the output from the adjacent optical subsystem is steered into the path of the next adjacent optical subsystem, and so forth. In effect, each subsystem provides a "spare" signal for the "guy to your right (or left)," with that "guy" being another subsystem.

This approach is repeated until the optical path that has been encumbered by the fault in its native subsystem receives a signal for the optical subsystem next to it, thereby replacing its faulty signal. The approach provides a signal from each subsystem into the next nearest subsystem in a domino effect. When a fault occurs, the original "spare" subsystem initiates the domino effect. Thereafter, each additional subsystem repeats that behavior until the output of the faulty subsystem is replaced by another active subsystem. In effect, by providing a single "spare" subsystem in the chassis, a fault occurring in any other subsystem can be corrected by providing a "spare signal for the next guy over." State information can then be shared between subsystems when the domino effect begins. Each subsystem then acts as if it is driving the output of the subsystem next to it. This results in the optical network units 102 receiving a data stream as expected without knowledge that the source of the downstream signal has changed due to a fault.

Figure 2:
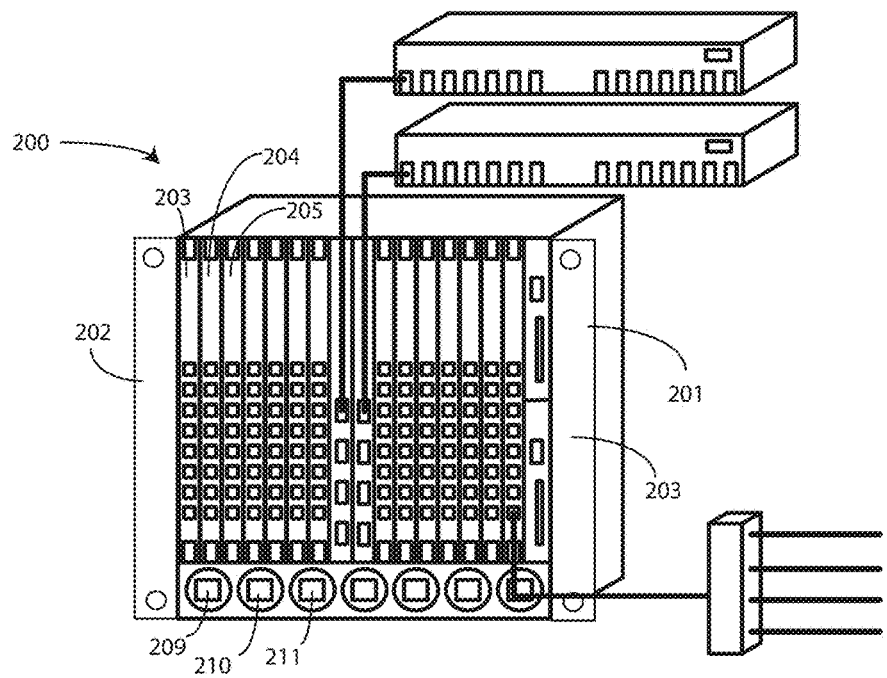
FIG. 2 illustrates an optical line terminal with chassis.

Turning now to FIG. 2, illustrated therein is an optical line terminal 200 suitable for use in a passive optical network. The optical line terminal 200 is housed in a chassis 201. The chassis 201 has rack-mounting features 202,203 that allow the optical line terminal 200 to be mounted in a rack at a central office.

Typical optical line terminals include a plurality of circuit cards 204,205,206. Each circuit card 204,205,206 includes a port 209,210,211 through which downstream optical signals can be sent and upstream optical signals can be received. Disposing the circuit cards 204,205,206 in the front of the chassis 201 provides a technician with convenient access to the ports 209,210,211. Accordingly, if a fiber is cut, another can be attached without removing the chassis 201 from the rack.

Figure 3:
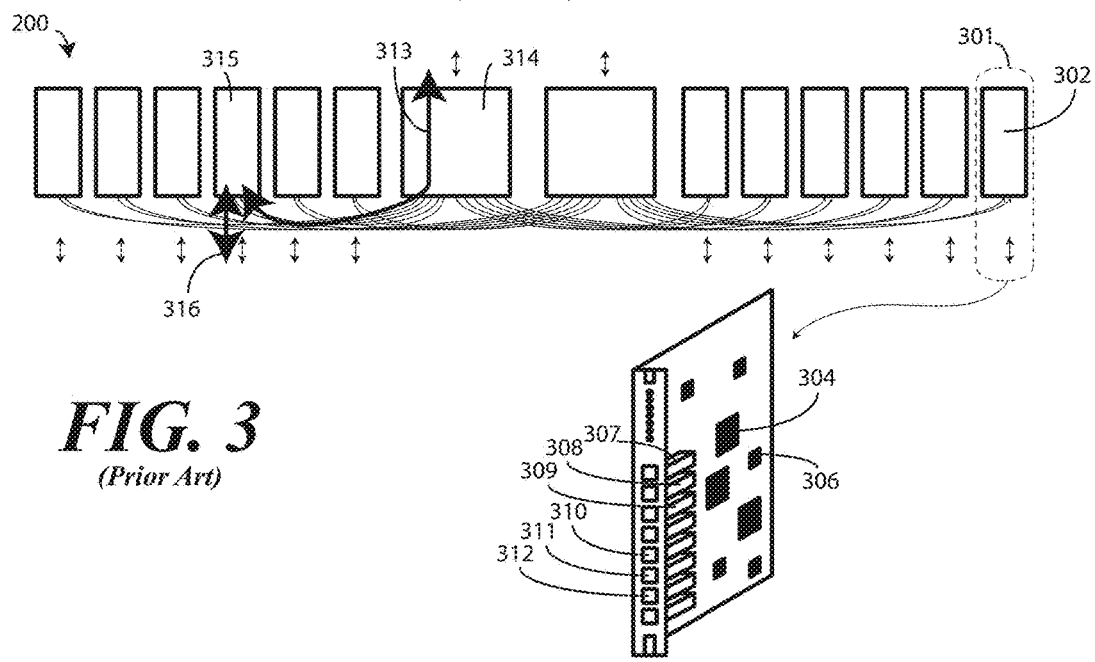
FIG. 3 illustrates a prior art circuit card for an optical line terminal.

Turning to FIG. 3, illustrated therein is a schematic block diagram of the circuit components of the optical line terminal 200. In this embodiment, an optical subsystem 301 resides on each circuit card, e.g., circuit card 302. The optical subsystem 301 includes control circuits 304, other circuits 306, and one or more lasers and/or photodetectors 307,308,309. Circuit card 303, disposed in the front of the chassis (201) can include one or more optical ports 310,311, 312.

As shown in FIG. 3, electrical signals 313, such as from an Ethernet connection or a coaxial cable, are received at a switch 314. These electrical signals then get routed to a circuit card 315. At this card 315, various signal processing can occur, such as the insertion of headers or other data into packets, quality of service processing, and so forth. Once this processing is complete, the electrical signals 313 are converted to optical signals 316. The optical signals 316 are then delivered over the passive optical network. Generally, they are delivered to optical line terminals or optical network units.

Figure 4:
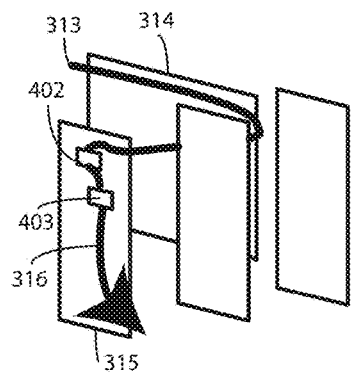
FIG. 4 illustrates a prior art data flow along circuit cards in an optical line terminal.

FIG. 4 illustrates a perspective view of this data flow. As shown in FIG. 4, data packets are received as electrical signals 313 at the switch 314. These electrical signals 313 then reach the circuit card 315, where they are converted to light signals at a laser of a photonic subsystem 402, which includes one or more light transmitting elements such as lasers and one or more photodetectors for receiving light signals such as photodoetectors. The optical signals 316 are then delivered to an optical switch 403 and are delivered through the port (310) to downstream passive optical network components.

As noted above, faults can occur anywhere within this system. Most prior art fault prevention systems focus on fiber cuts, and frequently provide parallel fibers emanating from the circuit card 315. As a result, when faults occur in the optical line terminal (200) itself, fixing them is cumbersome, time consuming, and costly.

Figure 5:
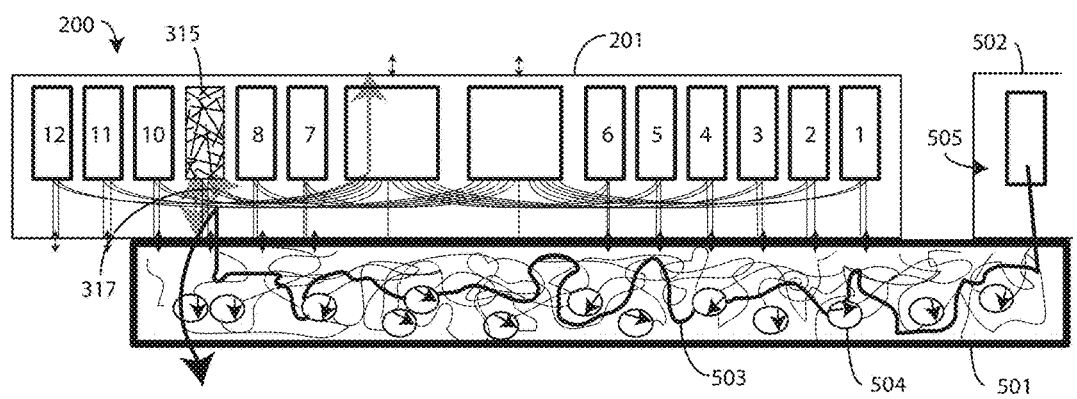
FIG. 5 illustrates a prior art fix for a faulty circuit card in an optical line terminal.

Turning to FIG. 5, a fault has occurred at packet forwarding module circuit card eight, which is circuit card 315. Perhaps a laser in the photonic subsystem (402) has failed. Perhaps software in the control circuit (304) has become corrupt. Whatever the reason, this circuit card 315 is now unable to transceiver optical signals through the port (310) of its corresponding photonic integrated circuit card 317. With prior art solutions, there is no easy fix for this scenario.

The current prior art fix is to use an external sparing strip 501 to bridge the faulty port (310) to another optical line terminal 502. The external sparing strip 501 is a cumbersome piece of hardware attached externally to the chassis 201 of the optical line terminal 200. The external sparing strip 501 adds complexity to the system and occupies valuable rack space to switch other active passive optical network circuits into operation and feed optical outputs to the passive optical network whenever a fault is detected in the primary passive optical network circuit. The external sparing strip 501 includes large amounts of cabling 503 and switches 504 disposed in the housing to bridge an optical subsystem 505 from another optical line terminal 502 to the faulty port.

This technique has several problems. First, it is cumbersome and labor intensive. Second, a technician must disconnect connections to the front of the chassis 201 to attach the external sparing strip 501. Third, significant losses occur in the external sparing strip 501, thus reducing the length of fiber across which the spared signals may travel. Fourth, this is merely a "1+1" sparing solution, in that a working optical subsystem 505 gets substituted for a faulty optical subsystem on a one-by-one basis. Implementing a 1+1 sparing solution is costly and results in significant network downtime.

Even when implemented, this prior art sparing solution bridging devices frequently inserts losses into the system reducing the overall length of the passive optical network. Optical losses occur as signal passes through connectors and across cards. In an example, consider an optical loss in single-mode fiber connectors that is ~0.2 dB. If a signal passes through two connectors in the external sparing strip for every "card-to-card hop," then a ~0.4 dB of loss is incurred between cards. This is in addition to losses at the connector to hop from optical line terminal 200 to external sparing strip 501 at the faceplate of the chassis 201. It is not uncommon to have between two and four dB in an external sparing strip, which is not preferred. This loss occurs prior to launching the signal on the long-distance fiber.

The inventors of the present disclosure have discovered that passive optical network operators do not prefer using the external sparing strip 501. It has been discovered that using this—or other prior art techniques for dealing with faults—is too expensive and complicated. Embodiments of the disclosure therefore provide a lower cost N+1 sparing solution that protects against faults in the software and hardware subsystems of the optical line terminal. Advantageously, embodiments of the disclosure are simple to install and implement. They also do not require external hardware components or redundant cabling. Embodiments of the disclosure employ clever routing of fibers between adjacent cards and clever designs of circuit cards. These designs do each of the following:

1. Minimize area consumed on the faceplate of an optical line terminal chassis. This is important, as faceplate area is needed to support normal system input and output connections. Accordingly, conservation of consumed area is a valuable benefit.

2. Reduce the amount of external cabling that is required outside of the chassis.

3. Minimize optical loss.

4. Reduce the number of ports that might temporarily experience packet loss when a fault condition occurs.

Figure 6:
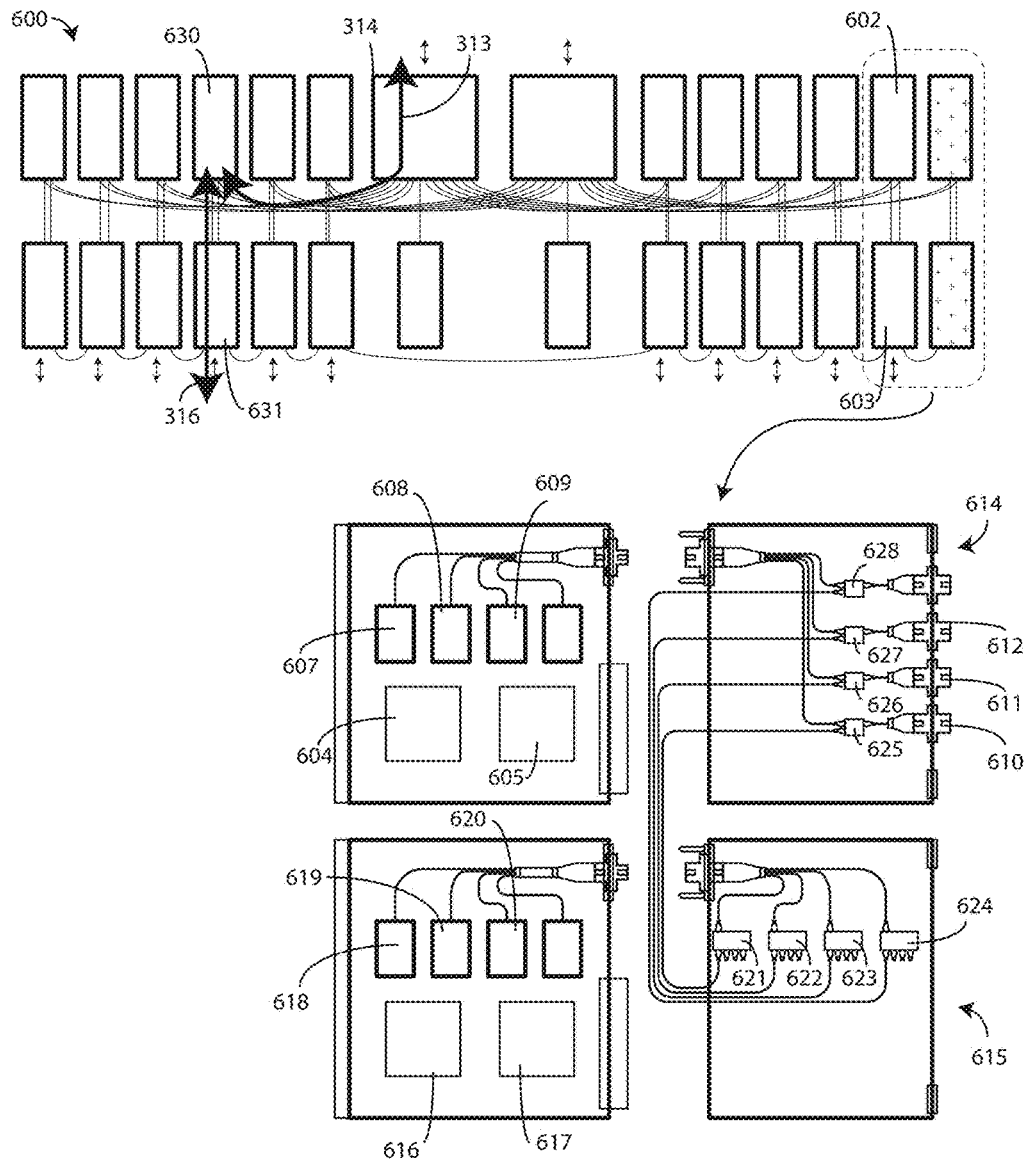
FIG. 6 illustrates an explanatory schematic block diagram for circuit cards for an optical line terminal in accordance with one or more embodiments of the disclosure.

Turning now to FIG. 6, illustrated therein is a schematic block diagram of the circuit components of an optical line terminal 600 configured in accordance with one or more embodiments of the disclosure. In one embodiment, optical subsystems each reside on each pair of packet forwarding module circuit cards, e.g., circuit card 602 and circuit card 603. Circuit card 602, which can be disposed in either the front or the rear of a chassis (201), includes control circuits 604, other circuits 606, and one or more photonic sub-assemblies 607,608,609. Circuit card 603, which can be disposed in the other of the front or rear of a chassis (201), can include one or more optical ports 610,611,612.

The optical line terminal 600 of FIG. 6 differs from that of FIG. 3 in that a spare optical subsystem 615 is provided. Like the optical subsystem residing on circuit card 602 and circuit card 603, the spare optical subsystem 615 includes control circuits 616, other circuits 617, and one or more photonic sub-assemblies 618,619,620. In one embodiment, the spare optical subsystem 615 either does not include a port or includes a port that is not used.

In one embodiment, both optical subsystem 614 and the spare optical subsystem 615 include one or more optical switches The illustrative spare optical subsystem 615 of this embodiment includes switches 621,622,623,624, which happen to be 1×4 switches, while optical subsystem 614 includes switches 625,626,627,628, which happen to be 1×2 switches. As will be described in more detail below, in one embodiment these switches 621,622,623,624,625,626,627,628 are to, when a fault condition is detected at a first optical subsystem preventing one or more of the delivery of first downstream optical signals generated by the first optical subsystem to the port of the first optical subsystem or the receipt of upstream optical signals at the port of the first optical subsystem, switch to deliver second downstream optical signals generated by a second optical subsystem to the port of the first optical subsystem.

When no fault conditions exist in the system, the operation of the optical line terminal 600 of FIG. 6 is much like that of the optical line terminal (200) of FIG. 3. Specifically, electrical signals 313, such as from an Ethernet connection or a coaxial cable, are received at a switch 314. These electrical signals then get routed across a midplane to a packet forwarding module circuit card 630, which is designed differently from the packet forwarding module circuit card (315) of FIG. 3.

At this card, various signal processing can occur, such as the insertion of headers or other data into packets, quality of service processing, and so forth. Once this processing is complete, the electrical signals 313 are converted to optical signals 316. The optical signals 316 are then delivered to a photonic integrated circuit card 631, which is also different from the photonic integrated circuit card (317) of FIG. 3. The optical signals 316 are then delivered from the photonic integrated circuit card 631 over the passive optical network. Generally, they are delivered to optical line terminals or optical network units.

When faults occur, however, the optical line terminal 600 of FIG. 6 works in an entirely different manner than the optical line terminal (200) of FIG. 3. One example of how this different operation helps to automatically obviate fault conditions will now be described with reference to FIGS. 7-9.

Figure 7:
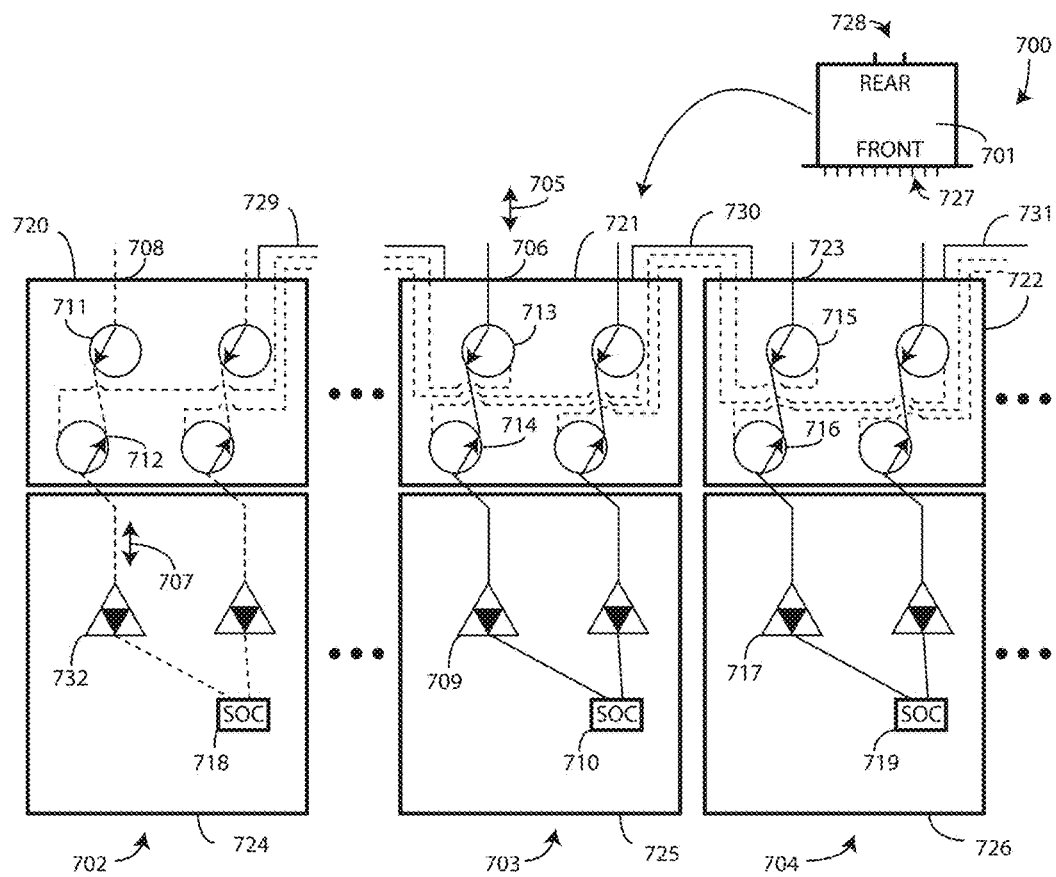
FIG. 7 illustrates explanatory optical subsystems in accordance with one or more embodiments of the disclosure.

Turning now to FIG. 7, illustrated therein is a schematic block diagram of components of one illustrative optical line terminal 700 operable in a passive network in accordance with one or more embodiments of the disclosure. The optical line terminal 700 includes a chassis 701 and a plurality of optical subsystems 702,703,704 that are disposed in the chassis 701. In practice, the number of optical subsystems will be greater than those shown in FIG. 7, as only three optical subsystems 702,703,704 are shown for simplicity.

Each optical subsystem 702,703,704 is operable to generate downstream optical signals for delivery to a port of each optical subsystem 702,703,704. For example, optical subsystem 703 generates downstream optical signals 705 with photonic subassembly 709 for delivery to the port 706 of optical subsystem 703. Control circuit 710 can be used to perform various operations on the signal, including signal processing, insertion of headers or other data into packets, quality of service processing, and so forth. In one embodiment, the control circuit 710 is an integrated "system on a chip" or "SOC" integrated circuit suitable for use in passive optical network systems. SOC chips are available from a variety of manufacturers. Optical subsystem 704 operates similarly.

Optical subsystem 702 is a spare optical subsystem to generate spare optical signals 707. In one embodiment, optical subsystem 702 does not include a port. In another embodiment, the port 708 of optical subsystem 702 is unused.

In one embodiment, each optical subsystem 702,703,704 includes one or more optical switches. For example, in this embodiment the spare optical subsystem 702 includes two optical switches, e.g., optical switches 711,712, for each photonic subassembly, e.g., photonic subassembly 732. Similarly, each of optical subsystems 703,704 includes a pair of optical switches 713,714,715,716 per photonic subassembly 709,717. While the illustrative optical switches 711,712,713,714,715,716 shown in this embodiment are 1×2 switches, it will be obvious to those of ordinary skill in the art having the benefit of this disclosure that other types of optical switches can also be used.

In this illustrative embodiment, the control circuits 710, 718,719 and photonic subassemblies 709,732,717 are disposed on photonic integrated circuit cards 724,725,726. The optical switches 711,712,713,714,715,716 and ports 706, 708,723 are disposed on packet forwarding module circuit cards 720,721,722. In this illustrative embodiment, each optical subsystem 702,703,704 is disposed along one packet forwarding module circuit card and one photonic integrated circuit card. For example, optical subsystem 703 is disposed on packet forwarding module circuit card 721 and photonic integrated circuit card 725. Said differently, each optical subsystem comprises a first portion disposed on a first circuit card and a second portion disposed on a second circuit card. As will be shown below with reference to subsequent figures, these components can be disposed on other cards as well.

In this illustrative embodiment, the photonic integrated circuit cards 724,725,726 are inserted into the front 727 of the chassis 701. The packet forwarding module circuit cards 720,721,722 are disposed in the rear 728 of the chassis 701. This results in the ports 706,708,723 being disposed along the rear 728 of the chassis 701. As will be shown below with reference to subsequent figures, these cards can be reversed, with the photonic integrated circuit cards 724,725,726 are inserted into the rear 728 of the chassis 701 while the packet forwarding module circuit cards 720,721,722 are disposed in the front 727 of the chassis 701. Accordingly, when the optical subsystems 702,703,704 are configured as in FIGS. 7-8, a first circuit card is inserted into one of a front 727 of the chassis 701 or a rear 728 of the chassis 701, while the second circuit card is inserted into another of the front 727 of the chassis 701 or the rear 728 of the chassis 701.

In this illustrative embodiment, one or more optical couplers 729,730,731 are included to couple the circuit cards together. In one embodiment, the optical couplers 729,730, 731 are to selectively deliver optical signals between the circuit cards based upon a state of the optical switches 711,712,713,714,715,716. In one embodiment, the optical couplers 729,730,731 are simply external optical jumpers coupled to the chassis 701. The optical couplers 729,730,731 serve as optical crossover linkages between the optical subsystems 702,703,704 in one or more embodiments. In one embodiment, a crossover is a subsystem that provides fiber-based inter-card connectivity for a group of X fibers running for one card to an adjacent card.

The crossover subsystem can be instantiated in several ways. In one or more embodiments, the crossover subsystem can be instantiated as X separate fiber pigtails that are connected by hand to the two cards. In other embodiments, the crossover subsystem can be instantiated as a ganged subassembly containing X integrated fibers in a plastic casing (for example) along with arrays of aligned connectors that can be pushed into receptacles on both of the two cards. Still other instantiations will be obvious to those of ordinary skill in the art having the benefit of this disclosure.

In this illustrative embodiment, each optical coupler 729, 730,731 couples together a pair of adjacent cards. For example, optical coupler 730 couples photonic integrated circuit card 725 and photonic integrated circuit card 726 together, thereby coupling adjacent optical subsystems, i.e., optical subsystem 703 and optical subsystem 704, together.

In this illustrative embodiment, the optical couplers 729, 730,731 are all disposed along the rear 728 of the chassis 701. However, as will be shown below, in other embodiments the optical couplers 729,730,731 are all disposed along the front 727 of the chassis 701. In still other embodiments, some optical couplers can be disposed along the front 727 of the chassis 701 while others are disposed along the rear 728 of the chassis 728.

In FIG. 7, the optical line terminal 700 is in normal operation. No fault conditions exist. Accordingly, the optical switches 711,712,713,714,715,716 are all in default states. For example, optical switches 713,714 are switched to deliver optical signals generated by photonic subassembly 709 to port 706. Similarly, optical switches 715,716 deliver optical signals generated by photonic subassembly 717 to port 723, and so forth. Spare optical subsystem 702 is not needed in normal operation, and is thus in an idle state. No optical signals pass through the optical couplers 729,730, 731, as indicated by the dashed lines.

Figure 8:
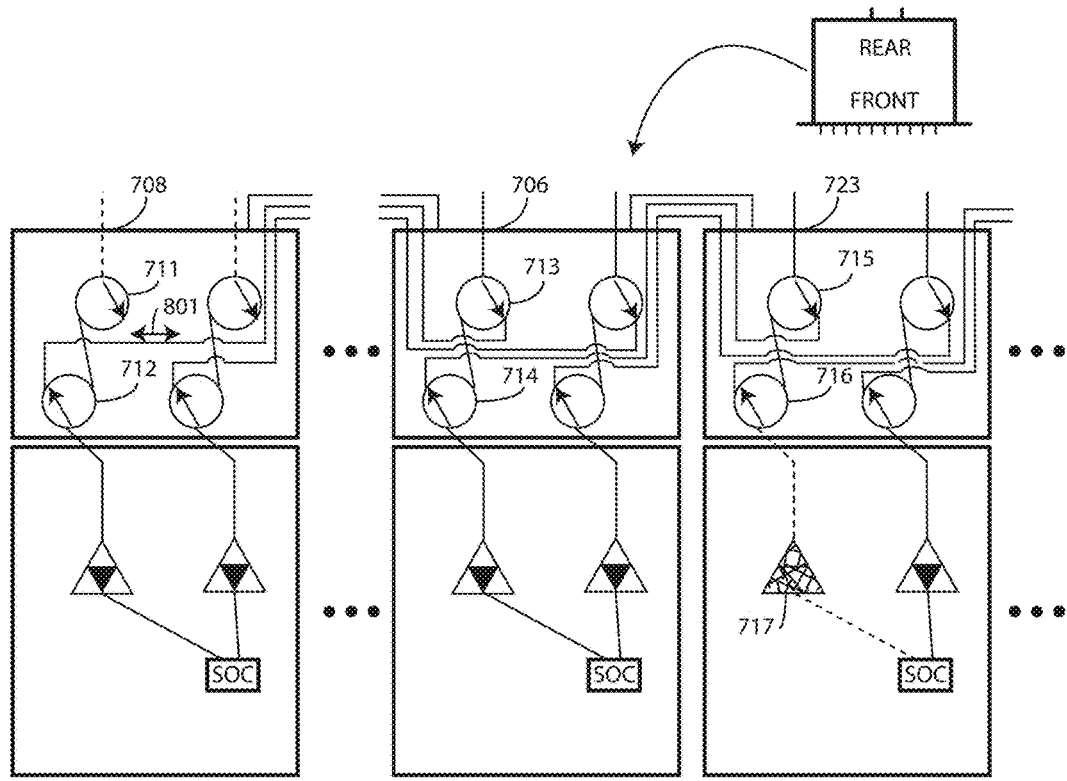
FIG. 8 illustrates the explanatory optical subsystems of FIG. 7 when a fault condition is detected.

Turning now to FIG. 8, a fault condition has occurred in photonic subassembly 717. This fault condition, which is likely a hardware fault, is shown for illustration only. The fault condition could have been a software fault or a fault with another hardware component. In any event, it is a fault condition occurring within the optical line terminal 700. This particular fault condition would prevent, for example, delivery of downstream optical signals through the port 723 of this optical subsystem 704. It would also prevent receipt of upstream optical signals through the port 723 as well.

In one embodiment, upon this fault condition being detected by the control circuit (604) or other logic disposed within the optical line terminal 700, the optical switches 711,712,713,714,715,716 are configured to switch to obviate the fault condition. In the illustrative embodiment of FIG. 8, two things have occurred: First, optical switches 711,712, 713 have switched to deliver spare downstream optical signals 801 generated by the spare optical subsystem 702 to optical subsystem 702 for downstream delivery through the port 706 of optical subsystem 703. Second, optical switches 714,715 have switched to deliver downstream optical signals 705 generated by optical subsystem 703 to the port 723 of optical subsystem 704 to overcome the fault condition occurring in photonic subassembly 717.

As illustrated, the fault condition is overcome during operation of the optical line terminal 700, not as a result of technician repair. As illustrated for the fiber routing technique shown in FIGS. 7-8, in one embodiment the disclosure provides a scheme that includes pluggable optics with no external cabling or switches. Embodiments also provide sparing to overcome fault conditions that involve very short signal distances between the control circuit and the photonic subassembly, with any necessary couplers consuming very little faceplate area along a chassis.

In one embodiment, optical subsystems 702,703,704 are arranged sequentially in a series. In one embodiment, the optical subsystems 702,703,704 are adjacent. For example, spare optical subsystem 702 may be adjacent to optical subsystem 703, while optical subsystem 703 is adjacent to optical subsystem 704, and so forth. When this occurs, the spare optical subsystem 702 delivers optical signals 801 to the optical subsystem 703 to which it is adjacent. Similarly, optical subsystem 703 delivers optical signals 705 to optical subsystem 704, and so forth. Accordingly, each optical subsystem 702,703,704 provides a "spare for the guy on the right." (Note that if the optical subsystems 702,703,704 were arranged in an opposite order, they would each provide a spare for the guy on the left.) Thus, action of the optical switches 711,712,713,714,715,716 switches in optical signals 801 from the spare optical subsystem 702 into the series of active optical subsystems, i.e., optical subsystems 703, 704. Further, action of the optical switches 711,712,713,714, 715,716 causes each other optical subsystem 703,704 to send and receive optical signals through the port of its neighbor. A domino effect from the spare optical subsystem 702 to the optical subsystem 703 experiencing the fault condition occurs to overcome the fault condition.

Accordingly, the embodiment of FIGS. 7-8 provides a N+1, i.e., N optical subsystems plus a spare optical subsystem, sparing technique that does not require installation and cabling to an external optical switch like the external sparing strip (501) of FIG. 5. The embodiment of FIGS. 7-8 eliminates the need for external cabling. In one or more embodiments, the action of the optical switches 711,712,713,714, 715,716 is automatic upon detection of a fault condition so that network down time and technician labor is greatly reduced or eliminated. In the embodiment of FIGS. 7-8, optical switches 711,712,713,714,715,716 integrated into the cards disposed within the chassis 701 of the optical line terminal to route signals to minimize consumed faceplate area along the chassis 701 and to reduce external cabling required outside the chassis. The embodiment of FIGS. 7-8 also works to minimize optical loss and/or minimize the number of ports that may temporarily experience packet loss when a sparing operation is initiated.

The embodiment of FIGS. 7-8, as with subsequent embodiments described below, disclose techniques supporting continuous optical line terminal availability by which an optical line terminal vendor may differentiate itself by adding a chassis-based integrated protection switch that allows N+1 sparing of optical line terminal circuitry to support a single fiber to the optical network unit. As described above, strategically steering the fibers that create the daisy chain between adjacent cards may route signals between cards to obviate fault conditions. As described above, the one-to-many spare card approach and the adjacent card sparing approach are advantageous over existing sparing approaches. In both embodiments, optical signals may be daisy-chained to adjacent cards to implement the sparing operation.

Figure 9:
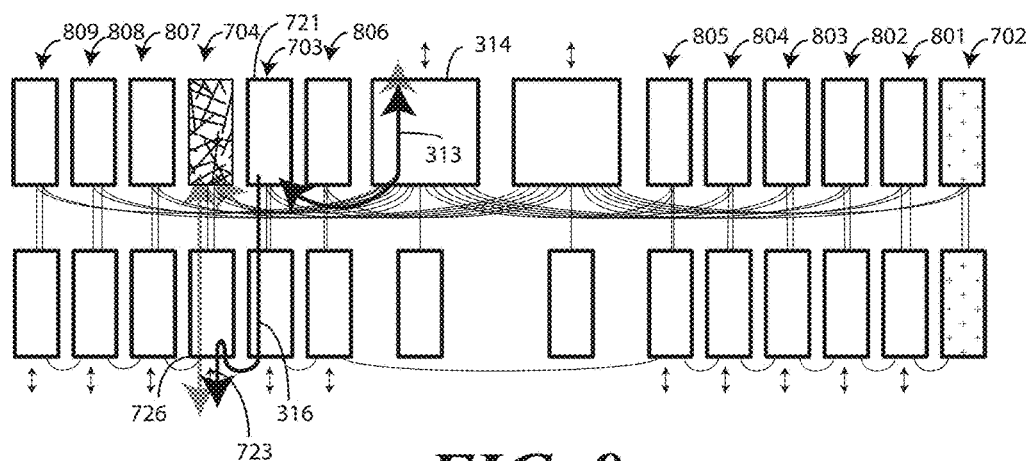
FIG. 9 illustrates an explanatory data flow in an optical line terminal configured in accordance with one or more embodiments of the disclosure during fault conditions.

Turning now to FIG. 9, illustrated therein is the signal flow occurring upon action of the optical switches (711,712, 713,714,715,716) as described above with reference to FIG. 8. FIG. 9 illustrates the full schematic block diagram of the optical line terminal 700, rather than a subset of optical subsystems as shown in FIGS. 7-8.

As shown in FIG. 9, a plurality of optical subsystems 901,902,903,904,905,906,703,704,907,908,909 are arranged sequentially in a series. Optical subsystem 901, is the first optical subsystem of the series, while optical subsystem 902 is the second optical subsystem. Optical subsystem 903 is the third, while optical subsystem 904 is the fourth, and so forth. The spare optical subsystem 702 is also included. In this illustrative embodiment, the spare optical subsystem 702 is separated from the optical subsystem 704 experiencing the fault condition by optical subsystems 901, 902,903,904,905,906.

In this arrangement, the plurality of optical subsystems 901,902,903,904,905,906,703,704, 907,908,909 comprise N optical subsystems, where N equals 11. The N optical subsystems are arranged in series from 1 to N, with optical subsystem 901 as the first optical subsystem of the series, optical subsystem 902 as the second, and so on. The fault condition here has occurred with the eighth optical subsystem, i.e., optical subsystem 704, which can be considered the Mth optical subsystem. As a fault could occur in any of the plurality of optical subsystems 901,902,903,904,905,906, 703, 704,907,908,909, the Mth optical subsystem could be any value between one and N, inclusive.

When the optical switches (711,712,713,714,715,716) of FIGS. 7-8 act, optical subsystems closer to the spare optical subsystem 702 deliver downstream optical signals to another optical subsystem. Said differently, where the faulty optical subsystem is the Mth optical subsystem, in this illustrative embodiment action of the optical switches (711,712,713, 714,715,716) causes optical subsystems one through M−1 to each deliver downstream optical signals to another optical subsystem. In the "spare for the guy to your left" scenario shown in FIG. 9, each of optical subsystems one through M−1 delivers its downstream optical signals to its next highest neighbor in the series. (Note that the same holds true for received upstream signals, each of optical subsystems one through M−1 receives upstream optical signals from its next highest neighbor as well.) Thus, inclusion of the spare optical subsystem 702, in addition to it being switched in to deliver spare optical signals to the first optical subsystem 901 of the series, provides a spare signal for each neighbor to the left to obviate the fault condition. Optical subsystems 907,908,909 operate normally.

Focusing on optical subsystems 703,704 to illustrate how each of optical subsystems one through M−1 occurs, electrical signals 313, such as from an Ethernet connection or a coaxial cable, are received at a switch 314. These electrical signals then get routed across a midplane to a packet forwarding module circuit card 721 of optical subsystem 703.

At this card, various signal processing can occur, such as the insertion of headers or other data into packets, quality of service processing, and so forth. Once this processing is complete, the electrical signals 313 are converted to optical signals 316. The optical signals 316 are then delivered to a photonic integrated circuit card 726 of optical subsystem 704. The optical signals 316 are then delivered from the port 723 of the photonic integrated circuit card 726 of optical subsystem 704 over the passive optical network. Optical line terminals or optical network units receiving signals from port 723 are unaware that the fault condition has occurred.

It should be noted that the path for the optical signals 316 being delivered from the packet forwarding module circuit card 721 of optical subsystem 703 to the photonic integrated circuit card 726 of optical subsystem 704 are significantly shorter than the path through the external sparing strip (501) of FIG. 5. Accordingly, losses are significantly reduced. Additionally, in one embodiment the optical switches switch automatically when the fault condition occurs, thereby eliminating the need for a technician to attach the external sparing strip (501) to the chassis. Rack space is reduced using embodiments of the disclosure. Additionally, complexity is reduced as well.

FIGS. 10-27, described below, will each illustrate alternate fiber routing techniques in accordance with embodiments of the disclosure for card-based optical line terminal sparing (in contrast to external, lossy, long-path sparing used in prior art solutions). In examining these figures, it is to be understood that the explanatory configurations are intended to depict examples of the disclosed techniques for fiber routing. However, alternate embodiments are contemplated. Still other embodiments will be obvious to those of ordinary skill in the art having the benefit of this disclosure. Some embodiments depict the disclosed fiber routing techniques with respect to the adjacent card sparing approach described above. However, it should be understood that the disclosed fiber routing techniques also apply to the one-to-many sparing approach described above with changes to the routing between the switch chips that would be known to one of skill in the art.

Figure 10:
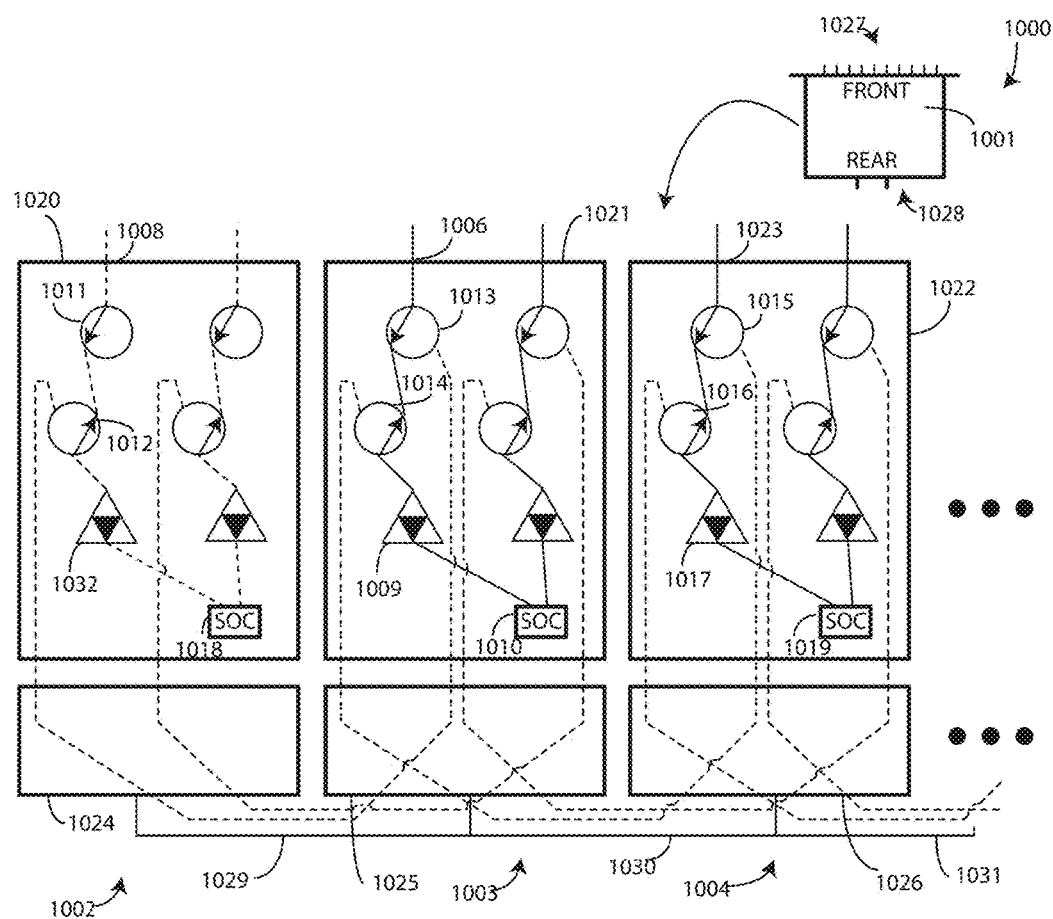
FIG. 10 illustrates alternate explanatory optical subsystems in accordance with one or more embodiments of the disclosure.

Beginning with FIG. 10, illustrated therein is a schematic block diagram of components of another illustrative optical line terminal 1000 operable in a passive network in accordance with one or more embodiments of the disclosure. The optical line terminal 1000 includes a chassis 1001 and a plurality of optical subsystems 1002,1003,1004 that are disposed in the chassis 1001.

Each optical subsystem 1002,1003,1004 is operable to generate downstream optical signals, deliver downstream optical signals to a port 1006,1008,1023 of each optical subsystem 1002,1003,1004, and to receive upstream optical signals from the port 1006,1008,1023 of each optical subsystem 1002,1003,1004. As with the embodiment of FIGS. 7-8, optical subsystem 1002 is a spare optical subsystem to generate spare optical signals in this embodiment. The port 1008 of optical subsystem 1002 can be omitted or can remain unused in one or more embodiments.

In one embodiment, each optical subsystem 1002,1003, 1004 includes one or more optical switches. For example, in this embodiment the spare optical subsystem 1002 includes two optical switches, e.g., optical switches 1011,1012, for each photonic subassembly, e.g., photonic subassembly 1032. Similarly, each of optical subsystems 1003,1004 includes a pair of optical switches 1013,1014,1015,1016 per photonic subassembly 1009,1017.

In this illustrative embodiment, the control circuits 1010,1018,1019, photonic subassemblies 1009,1032,1017, optical switches 1011,1012,1013,1014,1015,1016, and ports 1006,1008,1023 are all disposed on packet forwarding module circuit cards 1020,1021,1022. Additionally, these packet forwarding module circuit cards 1020,1021,1022 are inserted into the front 1027 of the chassis 1001, while the photonic integrated circuit cards 1024,1025,1026 are inserted into the rear 1028 of the chassis 1001. The photonic integrated circuit cards 1024,1025,1026 are used for routing optical signals between cards.

In this illustrative embodiment, optical couplers 1029,1030,1031 are again included to couple the circuit cards together. The optical couplers 1029,1030,1031 are to selectively deliver optical signals between the circuit cards based upon a state of the optical switches 1011,1012,1013,1014,1015,1016. The optical switches 1011,1012,1013,1014,1015,1016 are in a first state, which is the default state, in FIG. 10. They are in a second state, which occurs when a fault condition is detected, in FIG. 11. In this illustrative embodiment, the optical couplers 1029,1030,1031 are all disposed along the rear 1028 of the chassis 1001. This is in contrast to the embodiment of FIGS. 7-8 above.

In FIG. 10, the optical line terminal 1000 is in normal operation. No fault conditions exist. Accordingly, the optical switches 1011,1012,1013,1014,1015,1016 are all in default states. Spare optical subsystem 1002 is not needed in normal operation, and is thus in an idle state. No optical signals pass through the optical couplers 1029,1030,1031, as indicated by the dashed lines.

Figure 11:
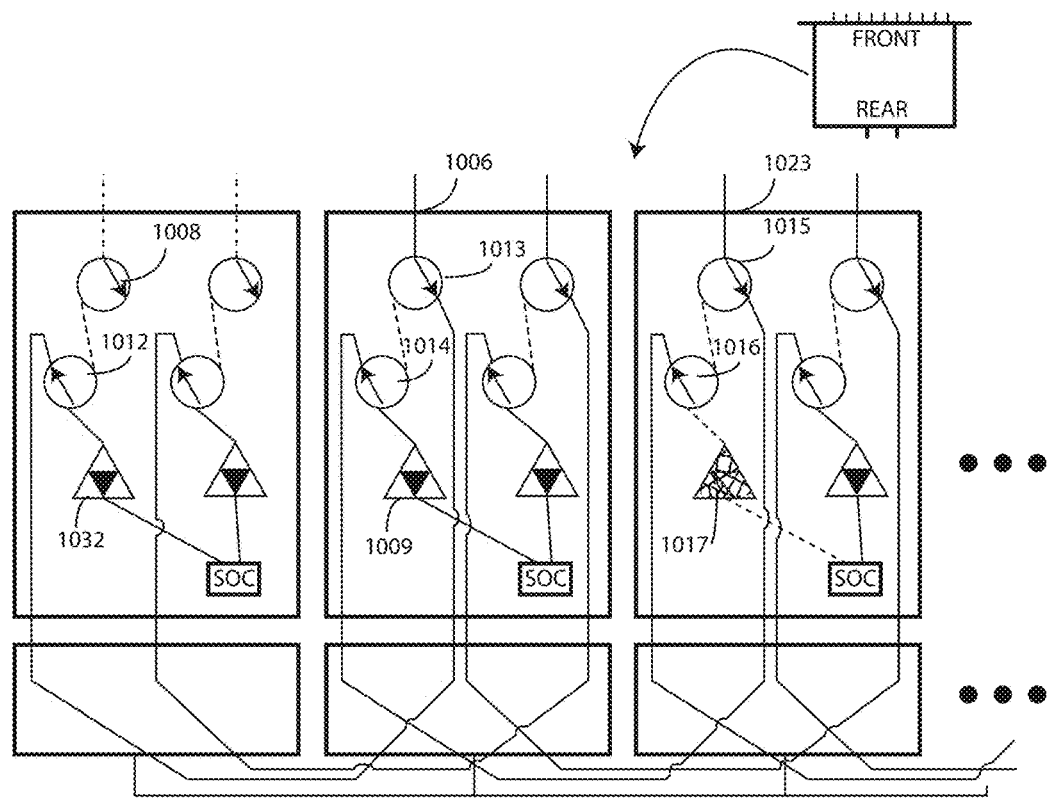
FIG. 11 illustrates the alternate explanatory optical subsystems of FIG. 10 when a fault condition is detected.

Turning now to FIG. 11, a fault condition has occurred in photonic subassembly 1017. In one embodiment, upon this fault condition being detected by the control circuit (604) or other logic disposed within the optical line terminal 1000, the optical switches 1011,1012,1013,1014,1015,1016 are configured to switch to overcome the fault condition. In FIG. 11, optical switches 1011,1012,1013 have switched to deliver spare downstream optical signals generated by the spare optical subsystem 1002 to optical subsystem 1003 for downstream delivery through the port 1006 of optical subsystem 1003. Second, optical switches 1014,1015 have switched to deliver downstream optical signals generated by optical subsystem 1003 to port 1023 of optical subsystem 1004 to overcome the fault condition occurring in photonic subassembly 1017.

Upstream optical signals would be received in similar fashion. Specifically, optical switches 1011,1012,1013 have switched to receive upstream optical from port 1006 at photonic subassembly 1032. Optical switches 1014,1015 have switched to receive upstream optical signals from port 1023 at photonic subassembly 1009.

Figure 12:
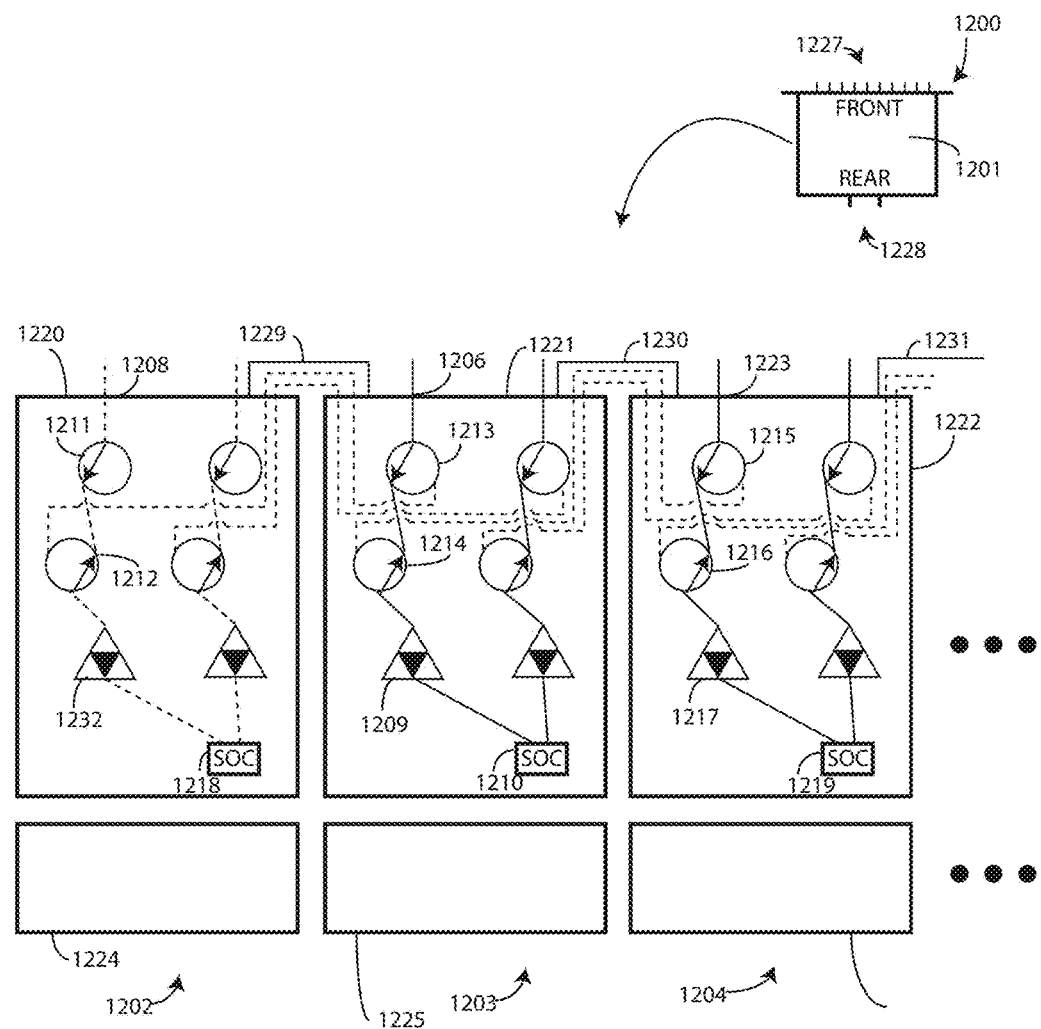
FIG. 12 illustrates still more alternate explanatory optical subsystems in accordance with one or more embodiments of the disclosure.

Turning now to FIG. 12, illustrated therein is a schematic block diagram of components of another illustrative optical line terminal 1200 operable in a passive network in accordance with one or more embodiments of the disclosure. The optical line terminal 1200 includes a chassis 1201 and a plurality of optical subsystems 1202,1203,1204 that are disposed in the chassis 1201.

Each optical subsystem 1202,1203,1204 is operable to generate downstream optical signals, deliver downstream optical signals to a port 1206,1208,1223 of each optical subsystem 1202,1203,1204, and to receive upstream optical signals from the port 1206,1208,1223 of each optical subsystem 1202,1203,1204. Optical subsystem 1202 is a spare optical subsystem to generate spare optical signals in this embodiment.

In one embodiment, each optical subsystem 1202,1203,1204 includes one or more optical switches. For example, in this embodiment the spare optical subsystem 1202 includes two optical switches, e.g., optical switches 1211,1212, for each photonic subassembly, e.g., photonic subassembly 1232. Similarly, each of optical subsystems 1203,1204 includes a pair of optical switches 1213,1214,1215,1216 per photonic subassembly 1209,1217.

In this embodiment, the control circuits 1210,1218,1219, photonic subassemblies 1209,1232,1217, optical switches 1211,1212,1213,1214,1215,1216, and ports 1206,1208,1223 are all disposed on packet forwarding module circuit cards 1220,1221,1222. These packet forwarding module circuit cards 1220,1221,1222 are inserted into the front 1227 of the chassis 1201, while the photonic integrated circuit cards 1224,1225,1226 are inserted into the rear 1228 of the chassis 1201. The photonic integrated circuit cards 1024,1025,1026 are unused for routing optical signals between cards in this embodiment.

The optical couplers 1229,1230,1231 again couple the circuit cards together. The optical couplers 1229,1230,1231 selectively deliver optical signals between the circuit cards based upon a state of the optical switches 1211,1212,1213,1214,1215,1216. The optical switches 1211,1212,1213,1214,1215,1216 are in a first state, which is the default state, in FIG. 12. They are in a second state, which occurs when a fault condition is detected, in FIG. 13. In this illustrative embodiment, the optical couplers 1229,1230,1231 are all disposed along the front 1427 of the chassis 1201. This is in contrast to the embodiment of FIGS. 10-11 above.

In FIG. 12, the optical line terminal 1200 is in normal operation. No fault conditions exist. Accordingly, the optical switches 1211,1212,1213,1214,1215,1216 are all in default states. Spare optical subsystem 1202 is not needed in normal operation, and is thus in an idle state. No optical signals pass through the optical couplers 1229,1230,1231, as indicated by the dashed lines.

Figure 13:
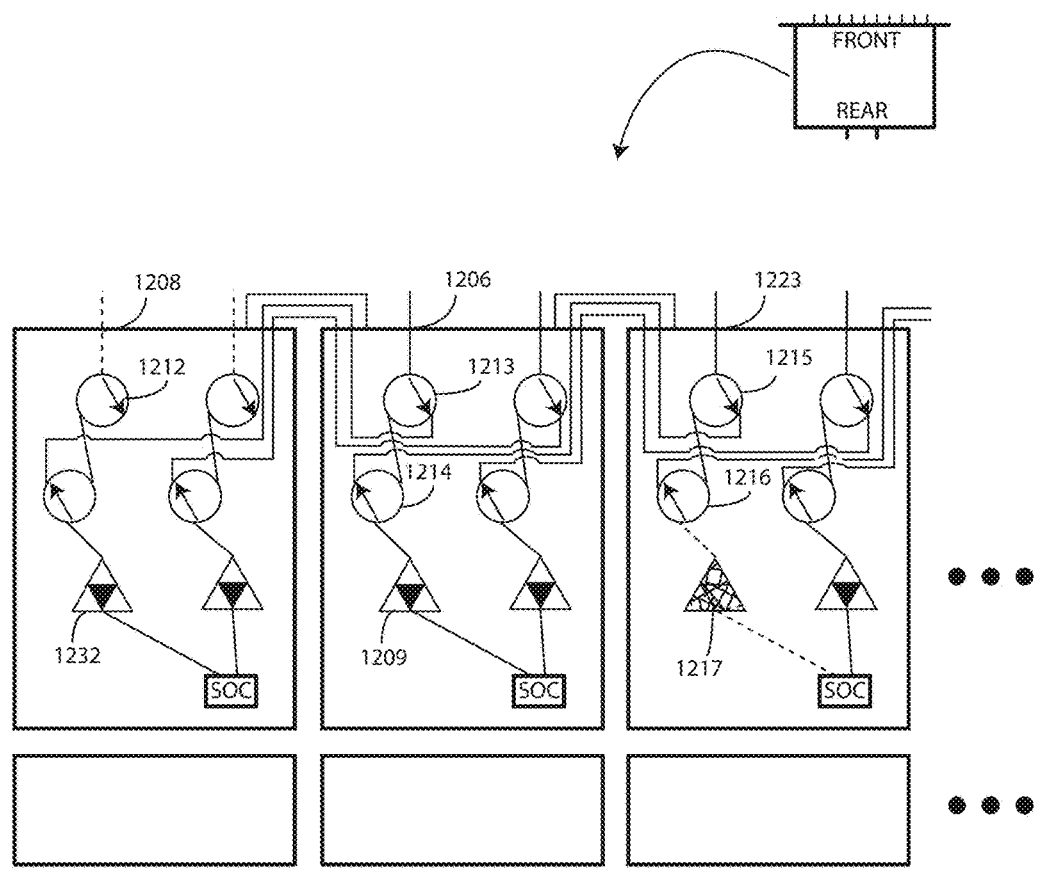
FIG. 13 illustrates the still more alternate explanatory optical subsystems of FIG. 12 when a fault condition is detected.

Turning to FIG. 13, a fault condition has occurred in photonic subassembly 1217. In one embodiment, upon this fault condition being detected by the control circuit (604) or other logic disposed within the optical line terminal 1200, the optical switches 1211,1212,1213,1214,1215,1216 are configured to switch to overcome the fault condition. In FIG. 12, optical switches 1211,1212,1213 have switched to deliver and receive optical signals to and from optical subsystem 1202 through port 1206 of optical subsystem 1203. Second, optical switches 1214,1215 have switched to deliver and receive optical signals at optical subsystem 1203 through port 1223 of optical subsystem 1204 to overcome the fault condition occurring in photonic subassembly 1217.

Figure 14:
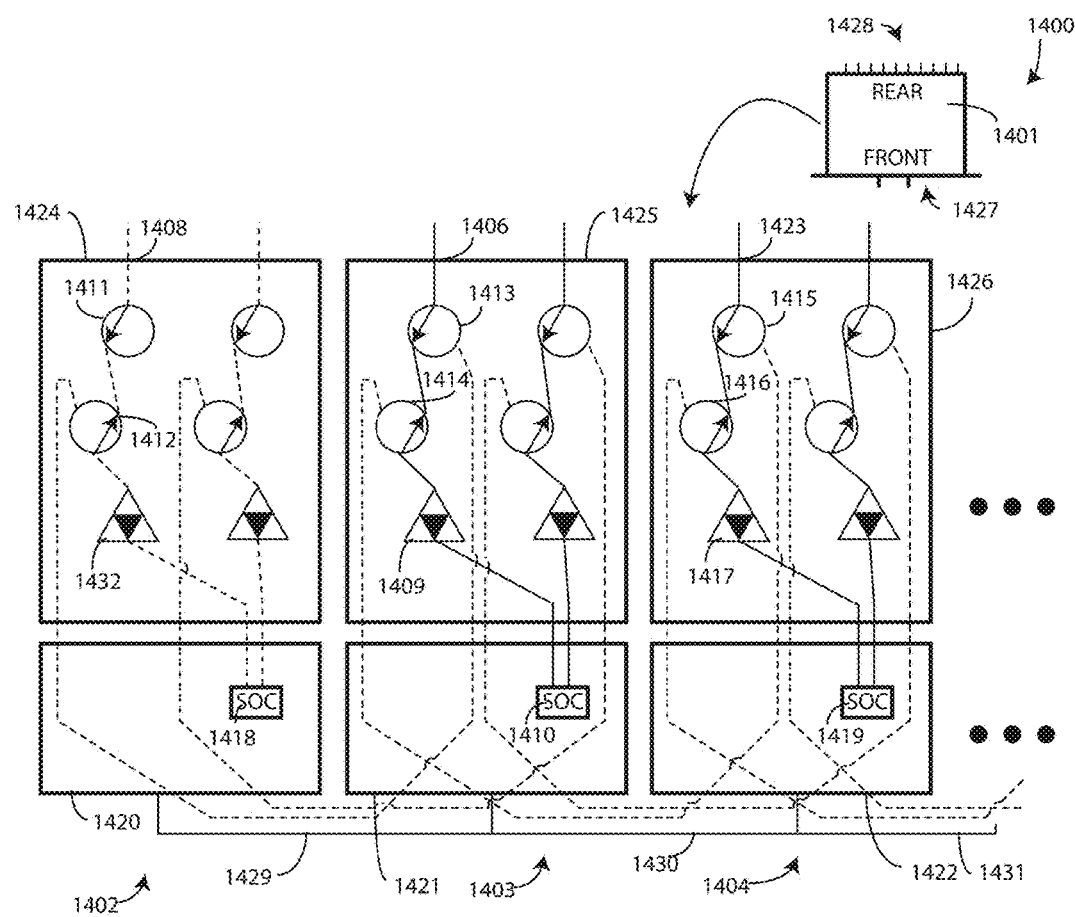
FIG. 14 illustrates still more alternate explanatory optical subsystems in accordance with one or more embodiments of the disclosure.

Turning now to FIG. 14, illustrated therein is another schematic block diagram of components of another illustrative optical line terminal 1400 operable in a passive network in accordance with one or more embodiments of the disclosure. The optical line terminal 1400 includes a chassis 1401 and a plurality of optical subsystems 1402,1403,1404 that are disposed in the chassis 1401.

Each optical subsystem 1402,1403,1404 is operable to generate downstream optical signals, deliver downstream optical signals to a port 1406,1408,1423 of each optical subsystem 1402,1403,1404, and to receive upstream optical signals from the port 1406,1408,1423 of each optical subsystem 1402,1403,1404. As with previous embodiments, optical subsystem 1402 is a spare optical subsystem to generate spare optical signals.

In one embodiment, each optical subsystem 1402,1403, 1404 includes one or more optical switches. Spare optical subsystem 1402 includes two optical switches, e.g., optical switches 1411,1412, for each photonic subassembly, e.g., photonic subassembly 1432. Similarly, each of optical subsystem 1403 and optical subsystem 1404 includes a pair of optical switches 1413,1414,1415,1416 per photonic subassembly 1409,1417.

In this embodiment, the photonic subassemblies 1409, 1432,1417, optical switches 1411,1412,1413,1414,1415, 1416, and ports 1406,1408,1423 are all disposed on the photonic integrated circuit cards 1424,1425,1426 are inserted into the rear 1428 of the chassis 1401. The control circuits 1410,1418,1419 are then disposed on packet forwarding module circuit cards 1420,1421,1422. These packet forwarding module circuit cards 1420,1421,1422 are inserted into the front 1427 of the chassis 1401.

Optical couplers 1429,1430,1431 again couple the circuit cards together. The optical couplers 1429,1430,1431 selectively deliver optical signals between the circuit cards based upon a state of the optical switches 1411,1412,1413,1414, 1415,1416. The optical switches 1411,1412,1413,1414, 1415,1416 are in a first state, which is the default state, in FIG. 14. They are in a second state, which occurs when a fault condition is detected, in FIG. 15. In this illustrative embodiment, the optical couplers 1429,1430,1431 are all disposed along the front 1427 of the chassis 1401, just as they were in the embodiments of FIGS. 12-13 above.

In FIG. 14, the optical line terminal 1400 is in normal operation. No fault conditions exist. Accordingly, the optical switches 1411,1412,1413,1414,1415,1416 are all in default states. Spare optical subsystem 1402 is not needed in normal operation, and is thus in an idle state. No optical signals pass through the optical couplers 1429,1430,1431, as indicated by the dashed lines.

Figure 15:
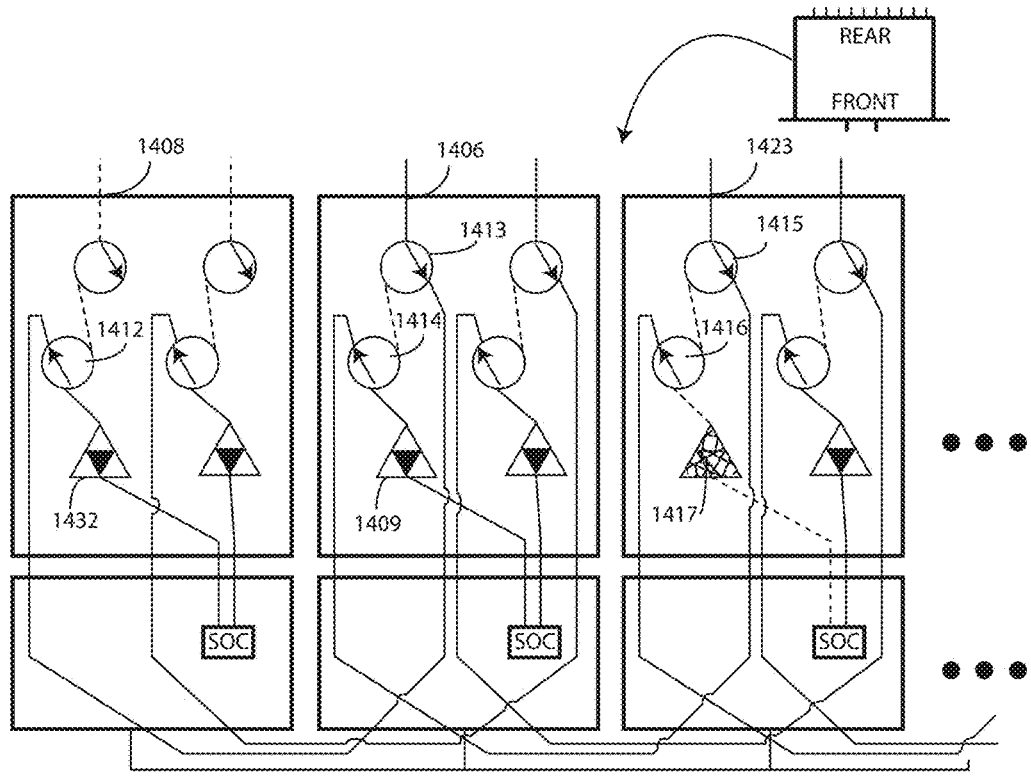
FIG. 15 illustrates the still more alternate explanatory optical subsystems of FIG. 14 when a fault condition is detected.

Turning to FIG. 15, a fault condition has occurred in photonic subassembly 1417. In one embodiment, upon this fault condition being detected by the control circuit 1419 or other logic disposed within the optical line terminal 1400, the optical switches 1411,1412,1413,1414,1415,1416 are configured to switch to overcome the fault condition. In FIG. 15, optical switches 1411,1412,1413 have switched to deliver and receive optical signals to and from optical subsystem 1402 through port 1406 of optical subsystem 1203, as indicated by the solid lines that were previously dashed in FIG. 14. Second, optical switches 1414,1415 have switched to deliver and receive optical signals at optical subsystem 1403 through port 1423 of optical subsystem 1404 to overcome the fault condition occurring in photonic subassembly 1417.

Figure 16:
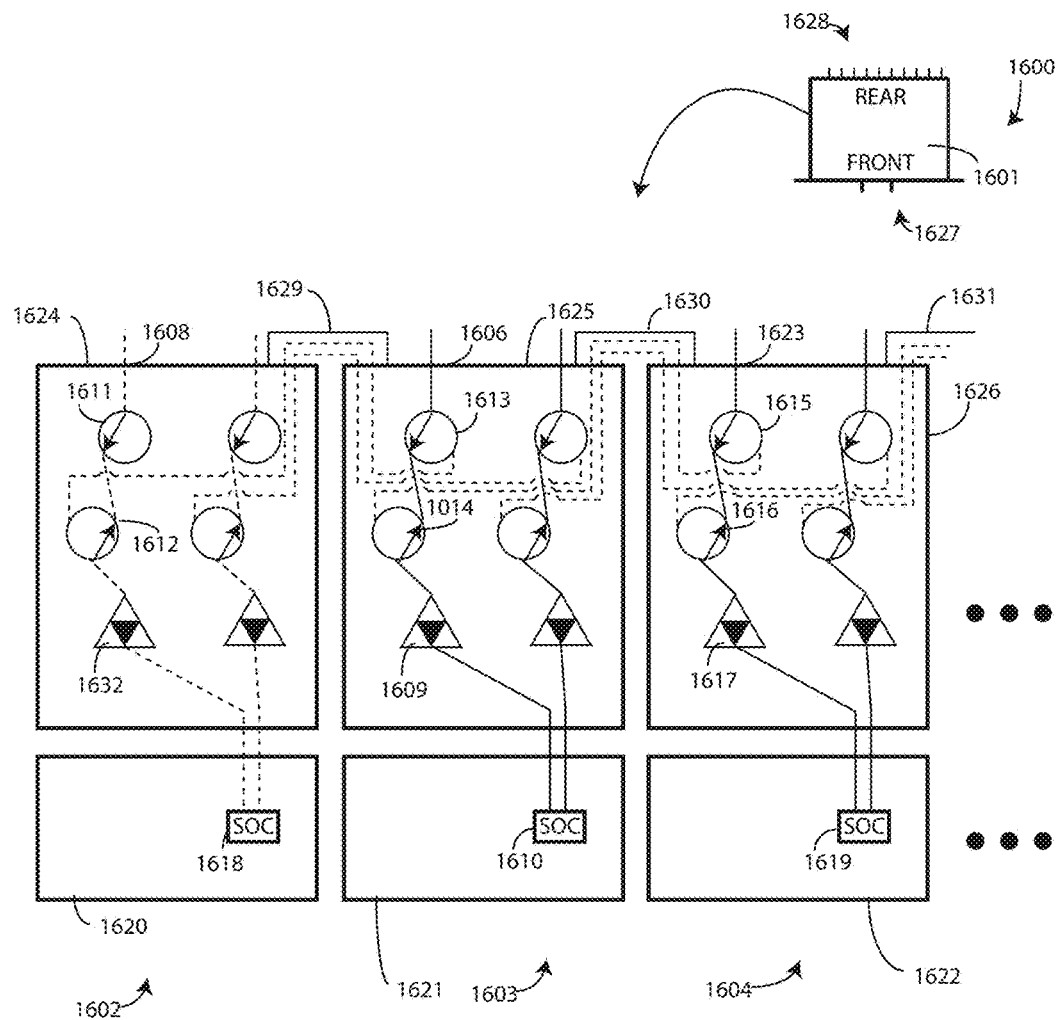
FIG. 16 illustrates still more alternate explanatory optical subsystems in accordance with one or more embodiments of the disclosure.
Figure 17:
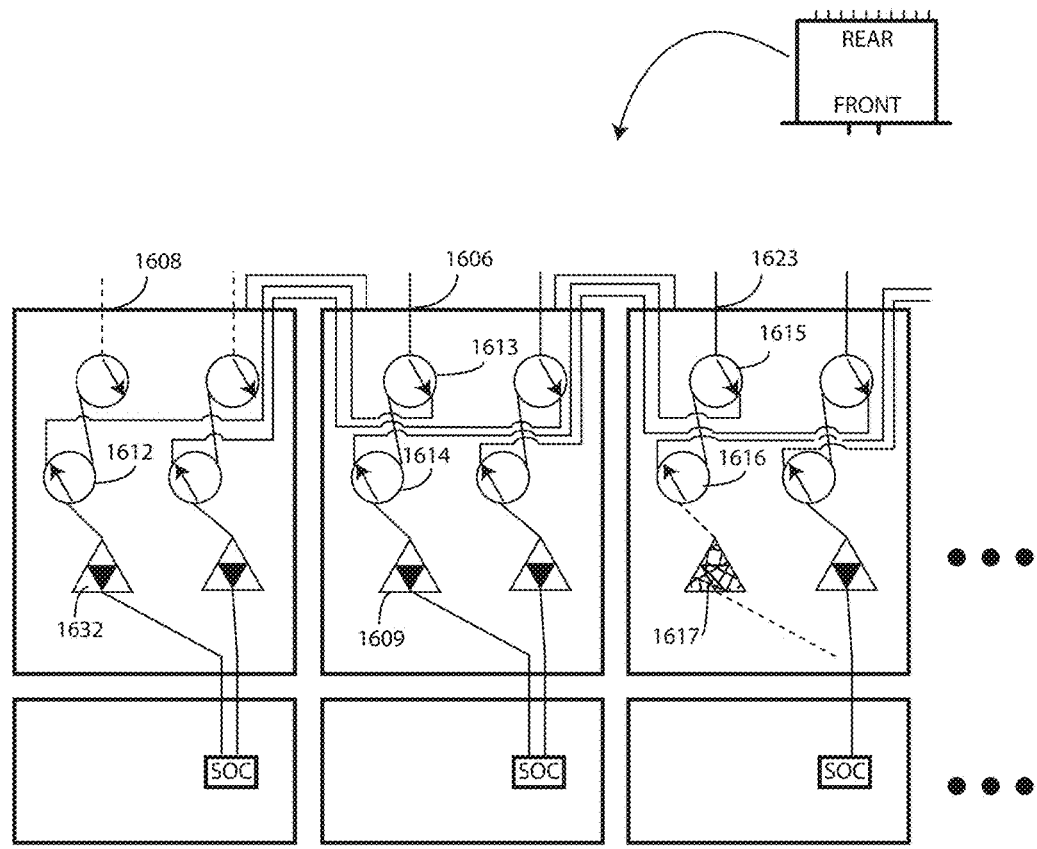
FIG. 17 illustrates the still more alternate explanatory optical subsystems of FIG. 16 when a fault condition is detected.

FIGS. 16-17 are similar to FIGS. 14-15, but with the optical couplers disposed on opposite sides of the chassis 1601. Beginning with FIG. 16, illustrated therein is another schematic block diagram of components of another illustrative optical line terminal 1600 operable in a passive network in accordance with one or more embodiments of the disclosure. The optical line terminal 1600 includes a chassis 1601 and a plurality of optical subsystems 1602,1603,1604 that are disposed in the chassis 1601.

Each optical subsystem 1602,1603,1604 is operable to generate downstream optical signals, deliver downstream optical signals to a port 1606,1608,1623 of each optical subsystem 1602,1603,1604, and to receive upstream optical signals from the port 1606,1608,1623 of each optical subsystem 1602,1603,1604. Note that while two ports per optical subsystem 1602,1603,1604 are shown in this and previous embodiments, it should be understood that more ports could exist per module. For instance, recall that the embodiment of FIG. 6 had four ports per card. Various numbers of ports will be obvious to those of ordinary skill in the art having the benefit of this disclosure based upon application. As with previous embodiments, optical subsystem 1602 is a spare optical subsystem to generate spare optical signals.

In one embodiment, each optical subsystem 1602,1603, 1604 includes one or more optical switches. Spare optical subsystem 1602 includes two optical switches, e.g., optical switches 1611,1612, for each photonic subassembly, e.g., photonic subassembly 1632. Similarly, each of optical subsystem 1403 and optical subsystem 1404 includes a pair of optical switches 1613,1614,1615,1616 per photonic subassembly 1609,1617.

In this embodiment, the photonic subassemblies 1609, 1632,1617, optical switches 1611,1612,1613,1614,1615, 1616, and ports 1606,1608,1623 are all disposed on the photonic integrated circuit cards 1624,1625,1626 are inserted into the rear 1628 of the chassis 1601. The control circuits 1610,1618,1619 are then disposed on packet forwarding module circuit cards 1620,1621,1622. These packet forwarding module circuit cards 1620,1621,1622 are inserted into the front 1627 of the chassis 1601.

Optical couplers 1629,1630,1631 again couple the circuit cards together. The optical couplers 1629,1630,1631 selectively deliver optical signals between the circuit cards based upon a state of the optical switches 1611,1612,1613,1614, 1615,1616. The optical switches 1611,1612,1613,1614, 1615,1616 are in a first state, which is the default state, in FIG. 16. They are in a second state, which occurs when a fault condition is detected, in FIG. 17. In this illustrative embodiment, the optical couplers 1629,1630,1631 are all disposed along the rear 1628 of the chassis 1601.

In FIG. 16, the optical line terminal 1600 is in normal operation. No fault conditions exist. Accordingly, the optical switches 1611,1612,1613,1614,1615,1616 are all in default states. Spare optical subsystem 1602 is not needed in normal operation, and is thus in an idle state. No optical signals pass through the optical couplers 1629,1630,1631, as indicated by the dashed lines.

Turning to FIG. 17, a fault condition has occurred in photonic subassembly 1617. In one embodiment, upon this fault condition being detected by the control circuit 1619 or other logic disposed within the optical line terminal 1600, the optical switches 1611,1612,1613,1614,1615,1616 are configured to switch to overcome the fault condition. In FIG. 17, optical switches 1611,1612,1613 have switched to deliver and receive optical signals to and from optical subsystem 1602 through port 1606 of optical subsystem 1603, as indicated by the solid lines that were previously dashed in FIG. 16. Second, optical switches 1614,1615 have switched to deliver and receive optical signals at optical subsystem 1603 through port 1623 of optical subsystem 1604 to overcome the fault condition occurring in photonic subassembly 1617, as also indicated by the solid lines that were previously dashed in FIG. 16.

Turning now to FIGS. 18-27, the "spare for the guy to the right" methodology will be expanded to illustrate how this technique can be used for fault correction between subsystems disposed along a single circuit card. In one or more embodiments, each subsystem can be designed to operate independently from another. For example, each subsystem can use its own power conditioning, signal conditioning, components, and so forth. Accordingly, failure in one subsystem does not affect other subsystems in one or more embodiments. When constructed in this fashion, any subsystem can provide and/or receive spare signals in for a fault condition occurring in another subsystem.

Figure 18:
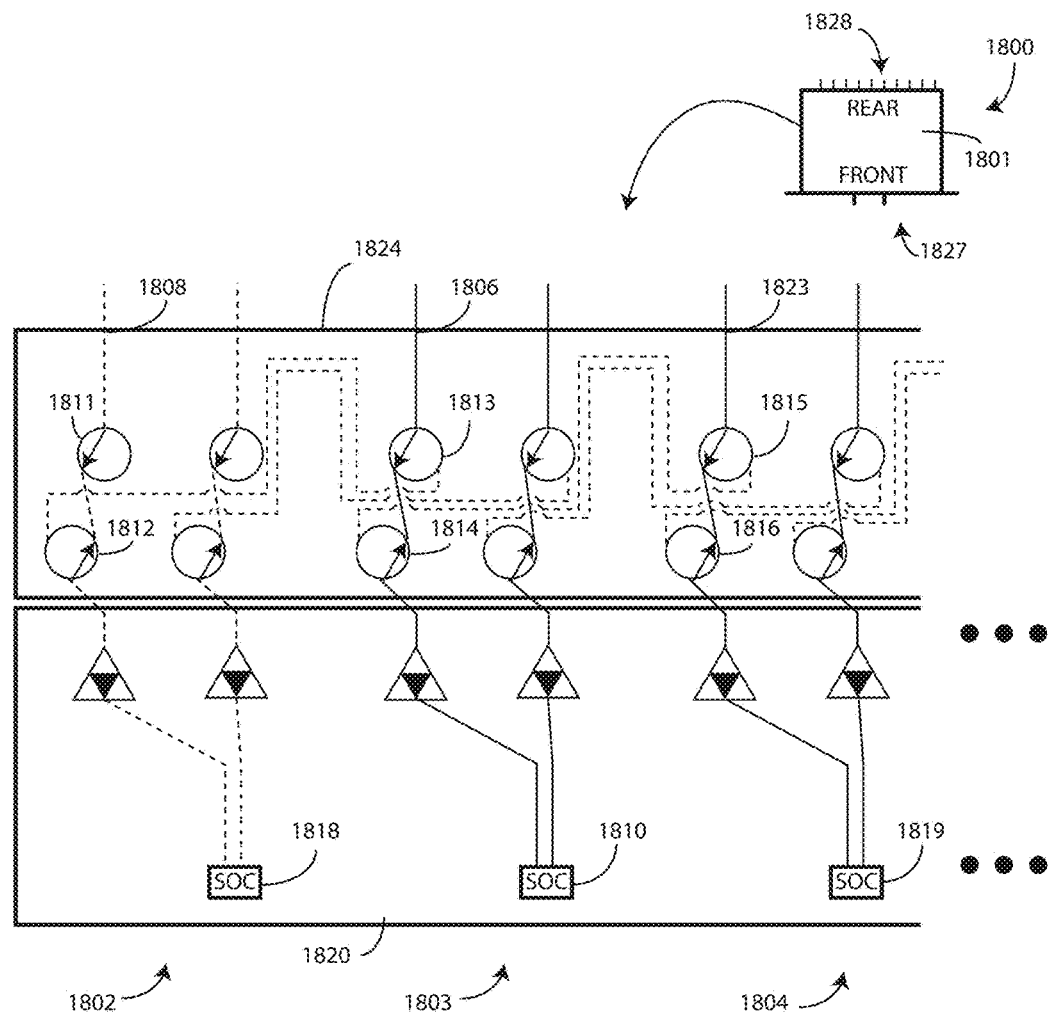
FIG. 18 illustrates still more alternate explanatory optical subsystems in accordance with one or more embodiments of the disclosure.

Beginning with FIG. 18, illustrated therein is another schematic block diagram of components of another illustrative optical line terminal 1800 operable in a passive network in accordance with one or more embodiments of the disclosure. The optical line terminal 1800 includes a chassis 1801 and a plurality of optical subsystems 1802,1803,1804 that are disposed in the chassis 1801.

Each optical subsystem 1802,1803,1804 is operable to generate downstream optical signals, deliver downstream optical signals to a port 1806,1808,1823 of each optical subsystem 1802,1803,1804, and to receive upstream optical signals from the port 1806,1808,1823 of each optical subsystem 1802,1803,1804. As with previous embodiments, optical subsystem 1802 is a spare optical subsystem to generate spare optical signals. Its port 1808 can either be omitted or remain unused, as indicated by the dashed lines.

In one embodiment, each optical subsystem 1802,1803, 1804 includes one or more optical switches. Spare optical subsystem 1802 includes two optical switches, e.g., optical switches 1811,1812, for each photonic subassembly, e.g., photonic subassembly 1832. Similarly, each of optical subsystem 1803 and optical subsystem 1804 includes a pair of optical switches 1813,1814,1815,1816 per photonic subassembly 1809,1817.

In this embodiment, each optical subsystem 1802,1803, 1804 is a subsystem of one circuit card or circuit card pair, i.e., a pair comprising one photonic integrated circuit card and one packet forwarding module circuit card. Accordingly, in this illustrative embodiment, all of the optical switches 1811,1812,1813,1814,1815,1816 and ports 1806,1808,1823 of the three subsystems, i.e., the three optical subsystems 1802,1803,1804, are all disposed on a single photonic integrated circuit card 1824 that is inserted into the rear 1828 of the chassis 1801. Meanwhile, all of the photonic subassemblies 1809,1832,1817 and control circuits 1810,1818,1819 are then disposed on a single packet forwarding module circuit card 1820. The packet forwarding module circuit card 1820 is inserted into the front 1827 of the chassis 1801. It should be noted that while three optical subsystems 1802, 1803,1804 are shown for illustration, any number of subsystems can be placed on a single card or pair of cards.

Figure 19:
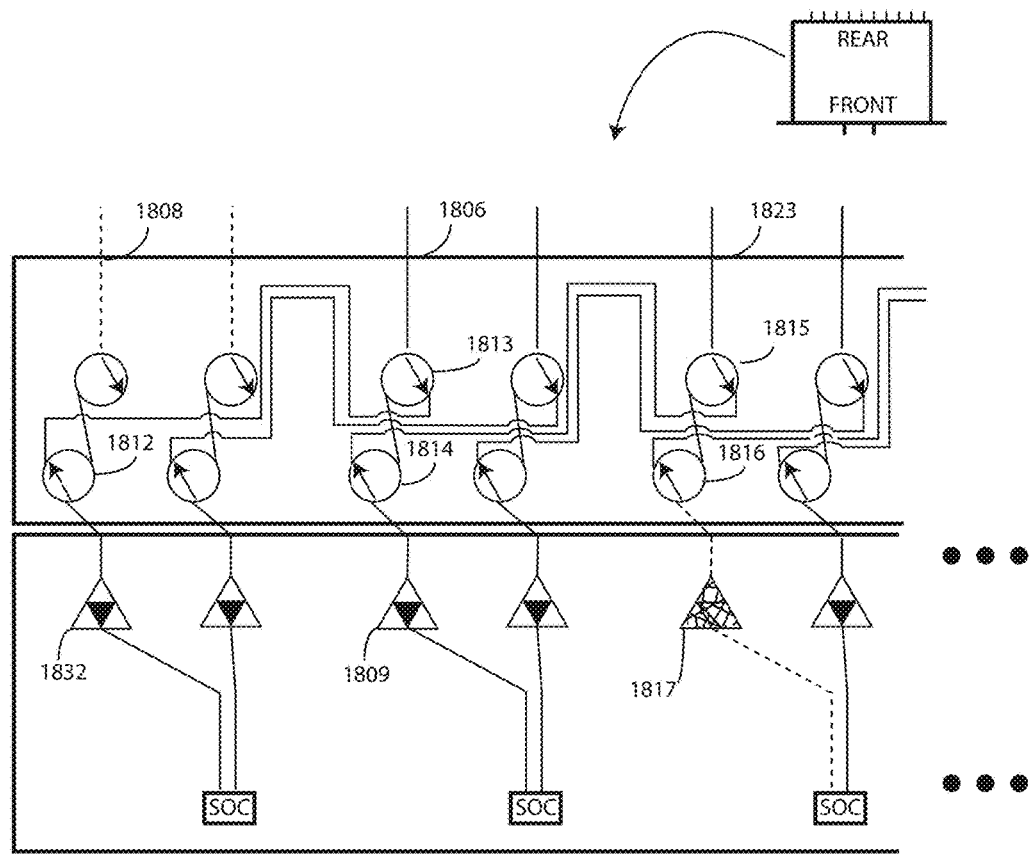
FIG. 19 illustrates the still more alternate explanatory optical subsystems of FIG. 18 when a fault condition is detected.

Since each subsystem is disposed on a single pair of cards, optical couplers are not required. (The midplane (not shown), bridges the two circuit cards as described above.) Traces can simply be run across each circuit card to provide "spare for a neighbor to your right (or left as the case may be)" fault condition correction. In FIGS. 18-19, dashes illustrate traces when not in use, while solid lines indicate traces through which active optical signals are passing.

The optical switches 1811,1812,1813,1814,1815,1816 are in a first state, which is the default state, in FIG. 18. They are in a second state, which occurs when a fault condition is detected, in FIG. 19. In FIG. 18, the optical line terminal 1800 is in normal operation. No fault conditions exist. Accordingly, the optical switches 1811,1812,1813,1814, 1815,1816 are all in default states. Spare optical subsystem 1802 is not needed in normal operation, and is thus in an idle state.

Turning to FIG. 19, a fault condition has occurred in photonic subassembly 1817. In one embodiment, upon this fault condition being detected by the control circuit 1819 or other logic disposed within the optical line terminal 1800, the optical switches 1811,1812,1813,1814,1815,1816 are configured to switch to overcome the fault condition. In FIG. 19, optical switches 1811,1812,1813 have switched to deliver and receive optical signals to and from optical subsystem 1802 through port 1806 of optical subsystem 1803, as indicated by the solid lines that were previously dashed in FIG. 18. Second, optical switches 1814,1815 have switched to deliver and receive optical signals at optical subsystem 1803 through port 1823 of optical subsystem 1804 to overcome the fault condition occurring in photonic subassembly 1817, as also indicated by the solid lines that were previously dashed in FIG. 18.

Figure 20:
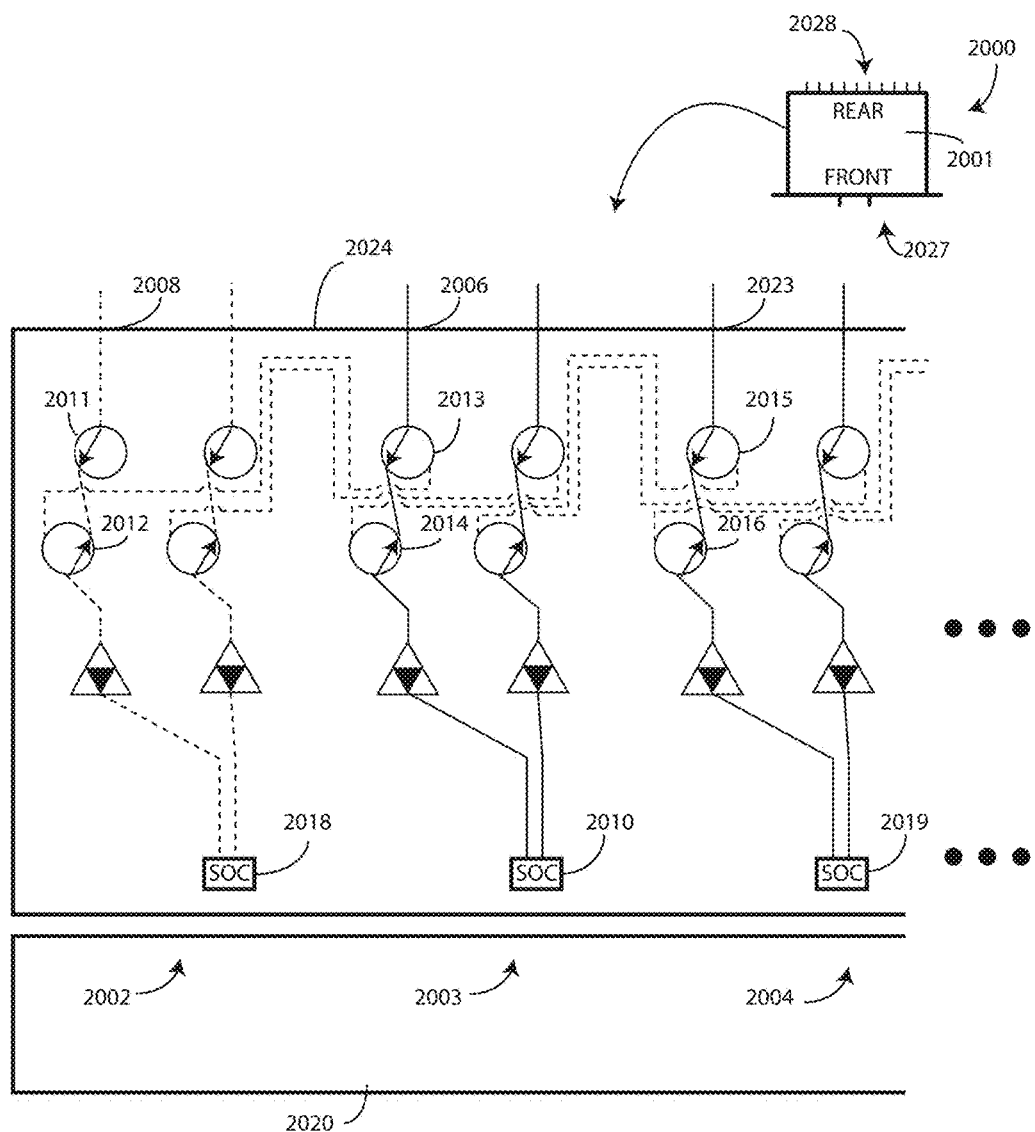
FIG. 20 illustrates still more alternate explanatory optical subsystems in accordance with one or more embodiments of the disclosure.

Turning now to FIG. 20, illustrated therein is another schematic block diagram of components of another illustrative optical line terminal 2000 operable in a passive network in accordance with one or more embodiments of the disclosure. The optical line terminal 2000 includes a chassis 2001 and a plurality of optical subsystems 2002,2003,2004 that are disposed in the chassis 2001.

Each optical subsystem 2002,2003,2004 is operable to generate downstream optical signals, deliver downstream optical signals to a port 2006,2008,2023 of each optical subsystem 2002,2003,2004, and to receive upstream optical signals from the port 2006,2008,2023 of each optical subsystem 2002,2003,2004. As with previous embodiments, optical subsystem 2002 is a spare optical subsystem to generate spare optical signals. Its port 2008 can either be omitted or remain unused, as indicated by the dashed lines.

In one embodiment, each optical subsystem 2002,2003, 2004 includes one or more optical switches. Spare optical subsystem 2002 includes two optical switches, e.g., optical switches 2011,2012, for each photonic subassembly, e.g., photonic subassembly 2032. Similarly, each of optical subsystem 2003 and optical subsystem 2004 includes a pair of optical switches 2013,2014,2015,2016 per photonic subassembly 2009,2017.

In this embodiment, as with the embodiment of FIGS. 18-19, each optical subsystem 2002,2003,2004 is a subsystem of one circuit card or circuit card pair. In this illustrative embodiment, all components of each optical subsystem 2002,2003,2004 are disposed on the packet forwarding module circuit card 2020. The optical switches 2011,2012, 2013,2014,2015,2016, ports 2006,2008,2023, photonic subassemblies 2009,2032,2017, and control circuits 2010,2018, 2019 are then disposed on a single packet forwarding module circuit card 2020, which is inserted into the front 2027 of the chassis 2001. The single photonic integrated circuit card 2024, which is that is inserted into the rear 2028 of the chassis 2001, is unused by the subsystems.

Figure 21:
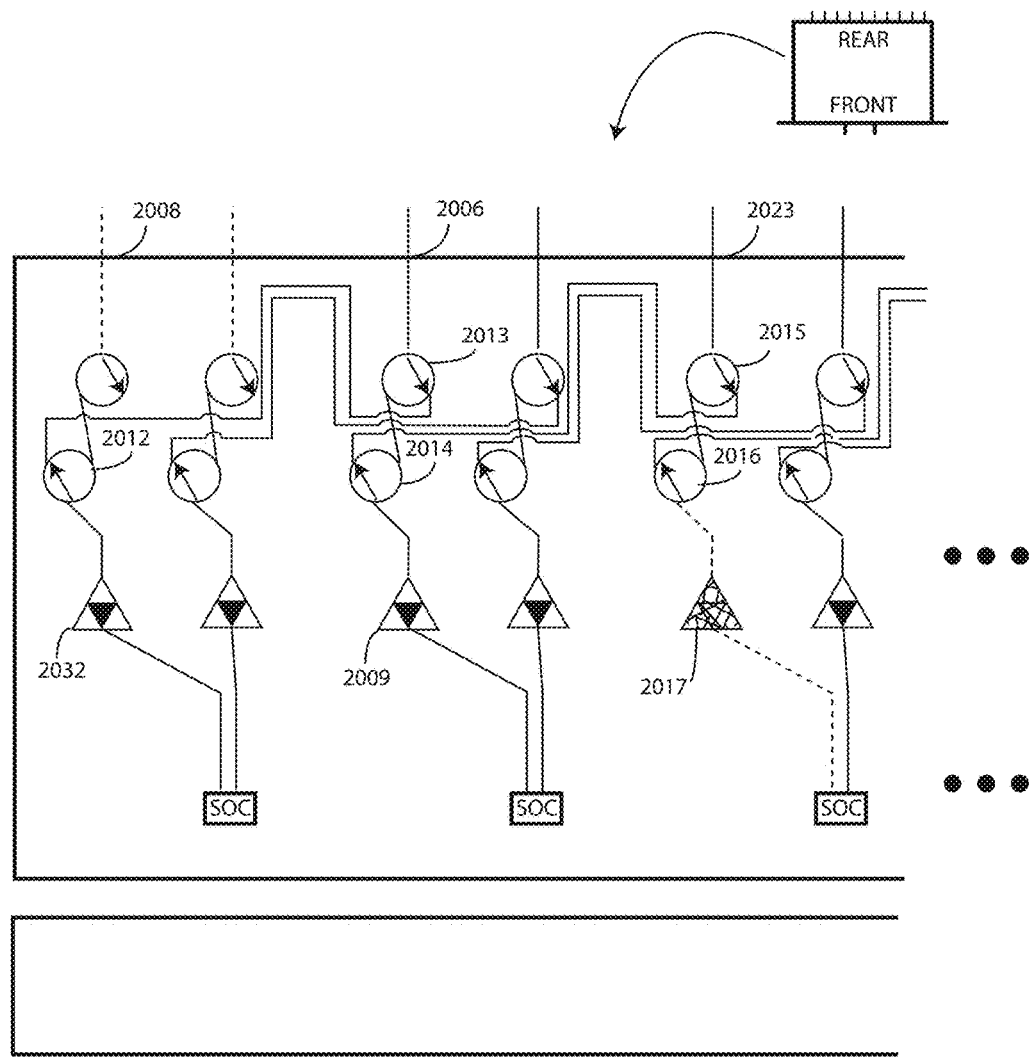
FIG. 21 illustrates the still more alternate explanatory optical subsystems of FIG. 20 when a fault condition is detected.

Since each subsystem is disposed on a single card, optical couplers are not required. Traces can simply be run across each circuit card to provide "spare for your next neighbor" fault condition correction. In FIGS. 20-21, dashes illustrate traces when not in use, while solid lines indicate traces through which active optical signals are passing.

The optical switches 2011,2012,2013,2014,2015,2016 are in a first state, which is the default state, in FIG. 20. They are in a second state, which occurs when a fault condition is detected, in FIG. 21. In FIG. 20, the optical line terminal 2000 is in normal operation. No fault conditions exist. Accordingly, the optical switches 2011,2012,2013,2014, 2015,2016 are all in default states. Spare optical subsystem 2002 is not needed in normal operation, and is thus in an idle state.

Turning to FIG. 21, a fault condition has occurred in photonic subassembly 2017. In one embodiment, upon this fault condition being detected by the control circuit 2019 or other logic disposed within the optical line terminal 2000, the optical switches 2011,2012,2013,2014,2015,2016 are configured to switch to overcome the fault condition. In FIG. 21, optical switches 2011,2012,2013 have switched to deliver and receive optical signals to and from optical subsystem 2002 through port 2006 of optical subsystem 2003, as indicated by the solid lines that were previously dashed in FIG. 20. Second, optical switches 2014,2015 have switched to deliver and receive optical signals at optical subsystem 2003 through port 2023 of optical subsystem 2004 to overcome the fault condition occurring in photonic subassembly 2017, as also indicated by the solid lines that were previously dashed in FIG. 20.

Of course, groups of circuit cards with multiple subsystems disposed thereon can be cascaded together using the same technique. This cascading is known as "card chaining" FIGS. 22-25 illustrate a few explanatory embodiments of how this card chaining can be employed.

Figure 22:
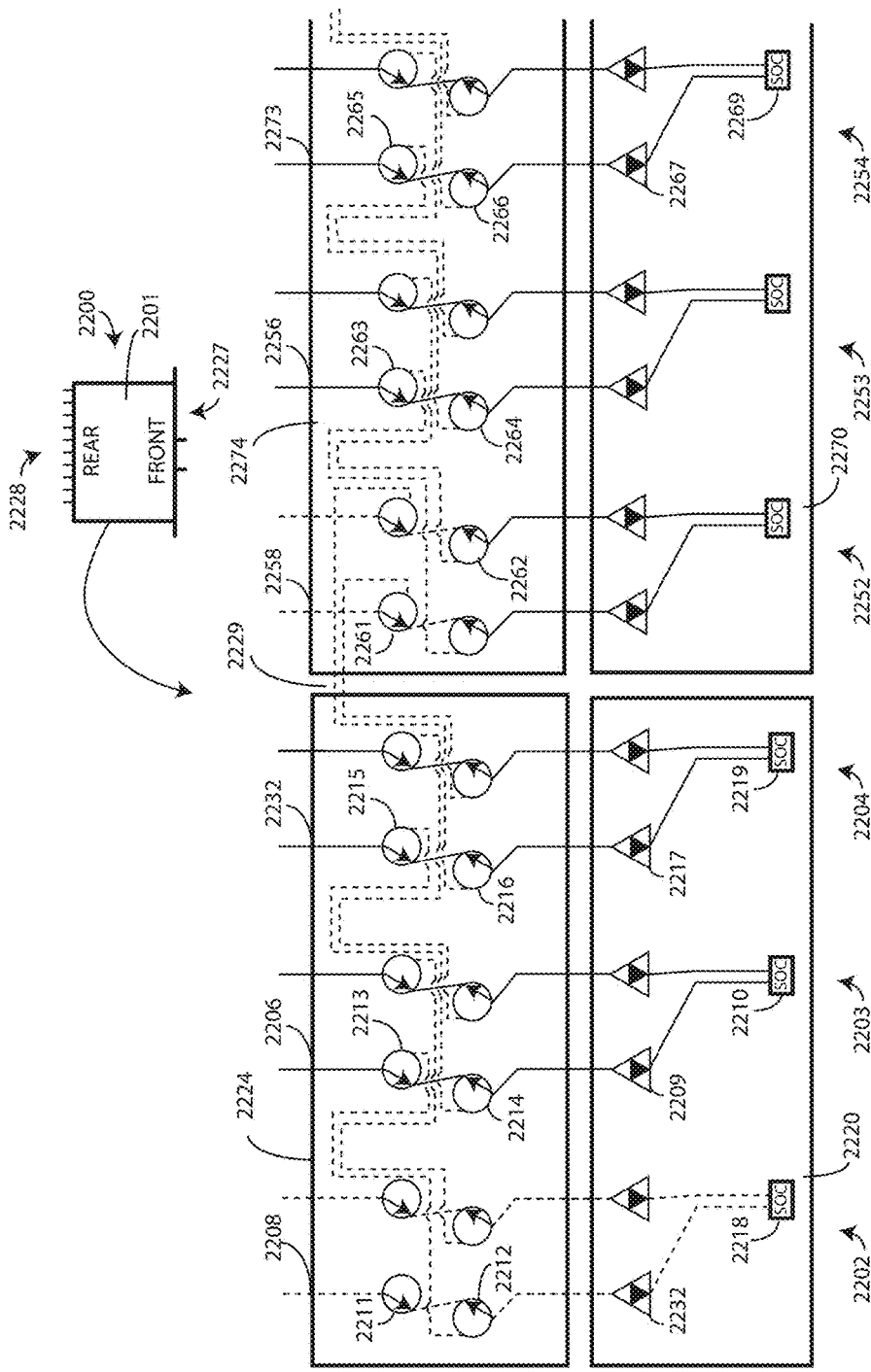
FIG. 22 illustrates still more alternate explanatory optical subsystems in accordance with one or more embodiments of the disclosure.

Beginning with FIG. 22, illustrated therein is another schematic block diagram of components of another illustrative optical line terminal 2200 operable in a passive network in accordance with one or more embodiments of the disclosure. The optical line terminal 2200 includes a chassis 2201 and a plurality of optical subsystems 2202,2203,2204,2252, 2253,2254 that are disposed in the chassis 2201.

Each optical subsystem 2202,2203,2204,2252,2253,2254 is operable to generate downstream optical signals, deliver downstream optical signals to a port 2206,2208,2223,2256, 2258,2273 of each optical subsystem 2202,2203,2204,2252, 2253,2254, and to receive upstream optical signals from the port 2206,2208,2223,2256,2258,2273 of each optical subsystem 2202,2203,2204,2252,2253,2254. As with previous embodiments, optical subsystem 2202 is a spare optical subsystem to generate spare optical signals. Its port 2208 can either be omitted or remain unused, as indicated by the dashed lines.

In one embodiment, each optical subsystem 2202,2203, 2204,2252,2253,2254 includes one or more optical switches. Spare optical subsystem 2202 includes two optical switches, e.g., optical switches 2211,2212, for each photonic subassembly, e.g., photonic subassembly 2232. Similarly, each of optical subsystem 2203 and optical subsystem 2204 includes a pair of optical switches 2213,2214,2215,2216 per photonic subassembly 2209,2217. Each module of optical subsystems 2252,2253,2254 includes the same configuration.

In this embodiment, each optical subsystem 2202,2203, 2204 is a subsystem of one circuit card or circuit card pair, while each optical subsystem 2252,2253,2254 is a subsystem of another circuit card or pair. Accordingly, in this illustrative embodiment, all of the optical switches 2211, 2212,2213,2214,2215,2216 and ports 2206,2208,2223 of the three subsystems, i.e., the three optical subsystems 2202, 2203,2204, are all disposed on a single photonic integrated circuit card 2224 that is inserted into the rear 2228 of the chassis 2201. Meanwhile, all of the photonic subassemblies 2209,2232,2217 and control circuits 2210,2218,2219 are then disposed on a single packet forwarding module circuit card 2220. The packet forwarding module circuit card 2220 is inserted into the front 2227 of the chassis 2201.

Figure 23:
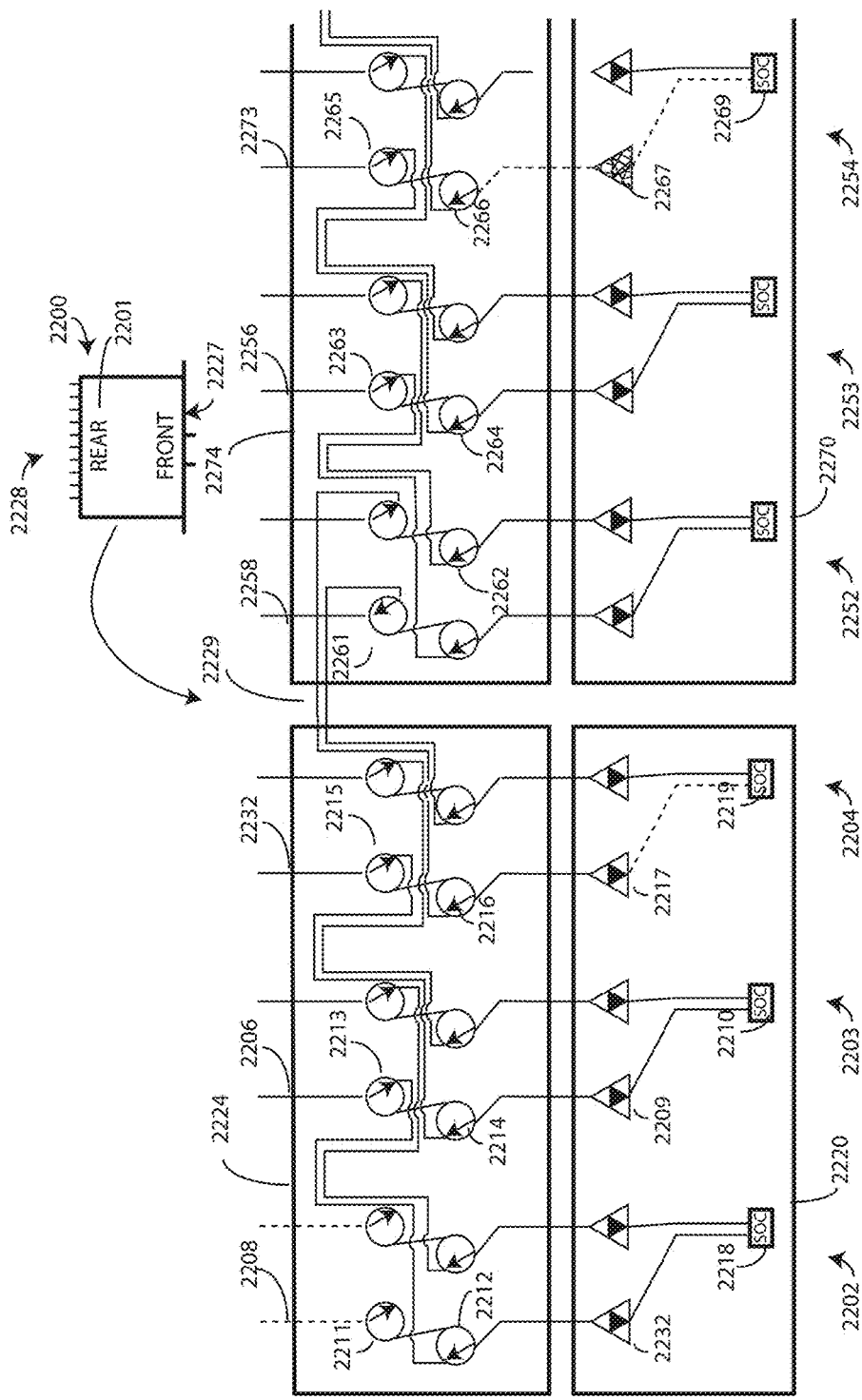
FIG. 23 illustrates the still more alternate explanatory optical subsystems of FIG. 22 when a fault condition is detected.

Each module of optical subsystems 2252,2253,2254 includes the same configuration, i.e., are similarly situated on another single photonic integrated circuit card 2274 and another single packet forwarding module circuit card 2270, respectively. A single optical coupler 2229 couples the circuit cards together and selectively delivers optical signals between the circuit cards based upon a state of the optical switches 2211,2212,2213,2214,2215,2216. In FIGS. 22-23, dashes illustrate traces when not in use, while solid lines indicate traces through which active optical signals are passing.

The optical switches 2211,2212,2213,2214,2215,2216 are in a first state, which is the default state, in FIG. 22. They are in a second state, which occurs when a fault condition is detected, in FIG. 23. In FIG. 22, the optical line terminal 2200 is in normal operation. No fault conditions exist. Accordingly, the optical switches 2211,2212,2213,2214, 2215,2216 are all in default states. Spare optical subsystem 2202 is not needed in normal operation, and is thus in an idle state.

Turning to FIG. 23, a fault condition has occurred in photonic subassembly 2267. In one embodiment, upon this fault condition being detected by the control circuit 2269 or other logic disposed within the optical line terminal 2200, the optical switches 2211,2212,2213,2214,2215, 2216,2261, 2262,2263,2264,2265,2266 are configured to switch to overcome the fault condition. In FIG. 23, optical switches 2211,2212,2213,2214,2215,2216, 2261,2262,2263,2264, 2265,2266 have switched as previously described to cause each optical subsystem to deliver signals to, and receive signals from, the port of its neighbor to the right, as indicated by the solid lines that were previously dashed in FIG. 22.

Accordingly, the embodiments of FIGS. 22 and 23 provide an optical line terminal 2200 comprising a chassis 2201. N optical subsystems 2203,2204,2205,2252,2253, 2254, where N is five in this embodiment, and a spare optical subsystem 2202, are each disposed within the chassis 2201. The N optical subsystems 2203,2204,2205,2252,2253,2254 are arranged sequentially from 1 to N in series.

Each of the N optical subsystems 2203,2204,2205,2252, 2253,2254 and the spare optical subsystem 2202 comprise photonic subassemblies, e.g., photonic subassembly 2209, operating as a phototransmitter to deliver optical signals to a port, e.g., port 2273, of each of the N optical subsystems 2203,2204,2205,2252,2253,2254. Each of the N optical subsystems 2203,2204,2205,2252,2253,2254 also includes one or more optical switches 2211,2212,2213, 2214,2215,2216, 2261,2262,2263,2264,2265,2266. Upon sensing a fault at the Mth optical subsystem, which is optical subsystem 2254 in this example, the optical switches 2211,2212,2213, 2214, 2215,2216,2261,2262,2263,2264,2265,2266 switch to deliver spare optical signals from the spare optical subsystem 2202 to a first optical subsystem of the series, i.e., optical subsystem 2203, and cause optical subsystems 1 to M−1, i.e., optical subsystems 2203,2204,2205,2252,2253, to each deliver optical signals generated thereon to optical subsystems 2 to M, i.e., optical subsystems 2204,2205,2252, 2253,2254, respectively. As also shown, each optical subsystem 2203,2204,2205, 2252,2253,2254 is disposed on one or more circuit cards 2220,2224,2270,2274. One or more passive optical couplers, e.g., optical coupler 2229, are disposed on the exterior of the chassis 2201 and couple adjacent circuit cards together. The optical couplers selectively deliver optical signals between the circuit cards based upon a state of the one or more switches, 2211,2212,2213, 2214,2215,2216,2261,2262,2263,2264,2265,2266.

Figure 24:
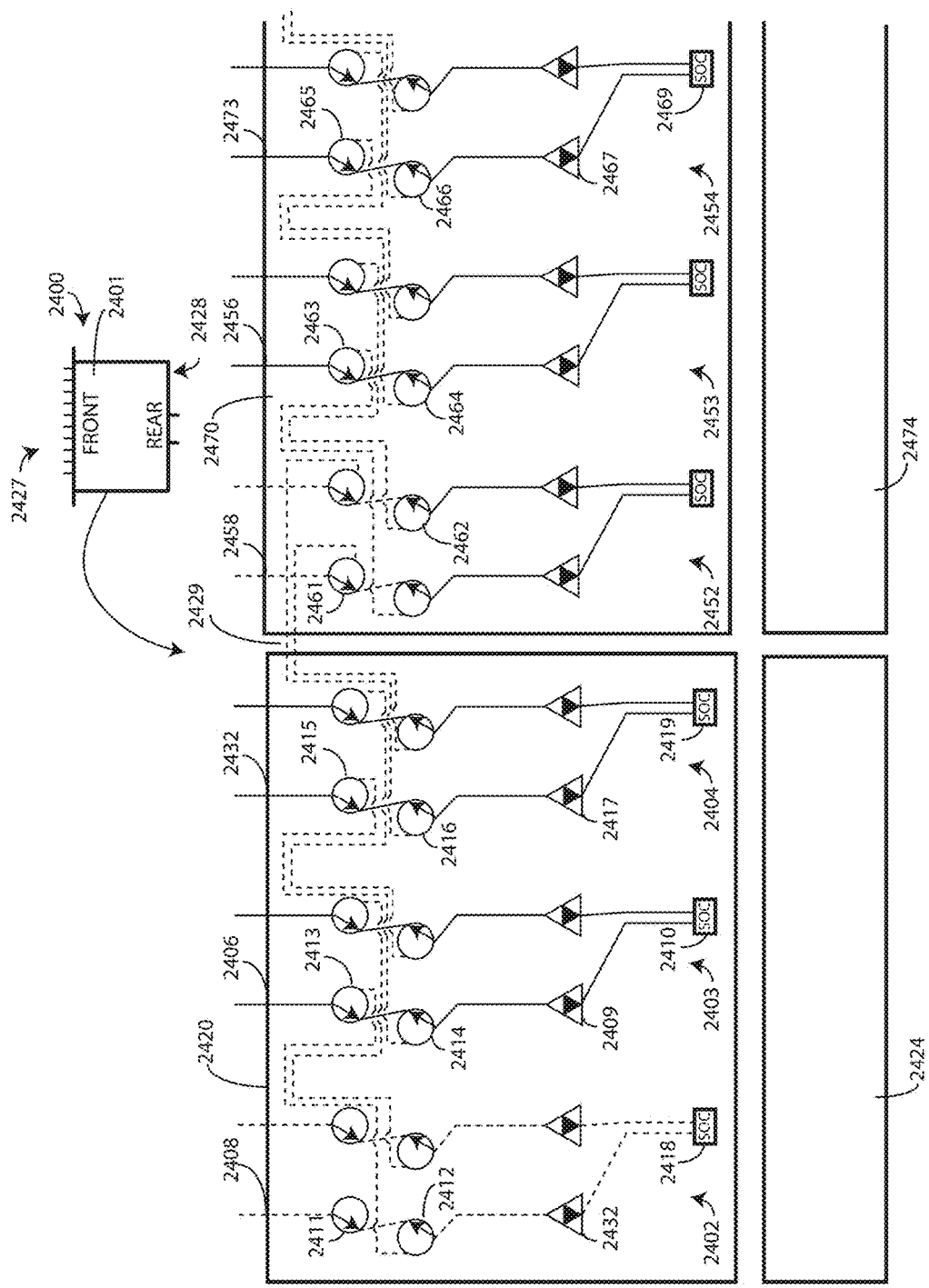
FIG. 24 illustrates still more alternate explanatory optical subsystems in accordance with one or more embodiments of the disclosure.

Turning now to FIG. 24, illustrated therein is another schematic block diagram of components of another illustrative optical line terminal 2400 operable in a passive network in accordance with one or more embodiments of the disclosure. The optical line terminal 2400 includes a chassis 2401 and a plurality of optical subsystems 2402,2403,2404,2452, 2453,2454 that are disposed in the chassis 2401.

Each optical subsystem 2402,2403,2404,2452,2453,2454 is operable to generate downstream optical signals, deliver downstream optical signals to a port 2406,2408,2423,2456, 2458,2473 of each optical subsystem 2402,2403,2404,2452, 2453,2454, and to receive upstream optical signals from the port 2406,2408,2423,2456,2458,2473 of each optical subsystem 2402,2403,2404,2452,2453,2454. As with previous embodiments, optical subsystem 2402 is a spare optical subsystem to generate spare optical signals. Its port 1808 can either be omitted or remain unused, as indicated by the dashed lines.

In one embodiment, each optical subsystem 2402,2403, 2404,2452,2453,2454 includes one or more optical switches. Spare optical subsystem 2402 includes two optical switches, e.g., optical switches 2411,2412, for each photonic subassembly, e.g., photonic subassembly 2432. Similarly, each of optical subsystem 2403 and optical subsystem 2404 includes a pair of optical switches 2413,2414,2415,2416 per photonic subassembly 2409,2417. Each module of optical subsystems 2452,2453,2454 includes the same configuration.

In this embodiment, each optical subsystem 2402,2403, 2404 is a subsystem of one circuit card or circuit card pair, while each optical subsystem 2452,2453,2454 is a subsystem of another circuit card or pair. Accordingly, in this illustrative embodiment, all of the optical switches 2411, 2412,2413,2414,2415,2416, ports 2406,2408,2423, photonic subassemblies 2409,2432,2417, and control circuits 2410,2418,2419 of the three subsystems, i.e., the three optical subsystems 2402,2403,2404, are all disposed on single packet forwarding module circuit card 2420. The packet forwarding module circuit card 2420 is inserted into the front 2427 of the chassis 2401. A single photonic integrated circuit card 2424 is inserted into the rear 2428 of the chassis 2201 and is not used by these modules.

Each module of optical subsystems 2452,2453,2454 includes the same configuration, i.e., are similarly situated on another single photonic integrated circuit card 2474 and another single packet forwarding module circuit card 2470, respectively. A single optical coupler 2429 couples the circuit cards together and selectively delivers optical signals between the circuit cards based upon a state of the optical switches 2411,2412,2413,2414,2415,2416. As with above embodiments, dashes illustrate traces when not in use, while solid lines indicate traces through which active optical signals are passing.

The optical switches 2411,2412,2413,2414,2415,2416 are in a first state, which is the default state, in FIG. 24. They are in a second state, which occurs when a fault condition is detected, in FIG. 25. In FIG. 24, the optical line terminal 2400 is in normal operation. No fault conditions exist. Accordingly, the optical switches 2411,2412,2413,2414, 2415,2416 are all in default states. Spare optical subsystem 2402 is not needed in normal operation, and is thus in an idle state.

Figure 25:
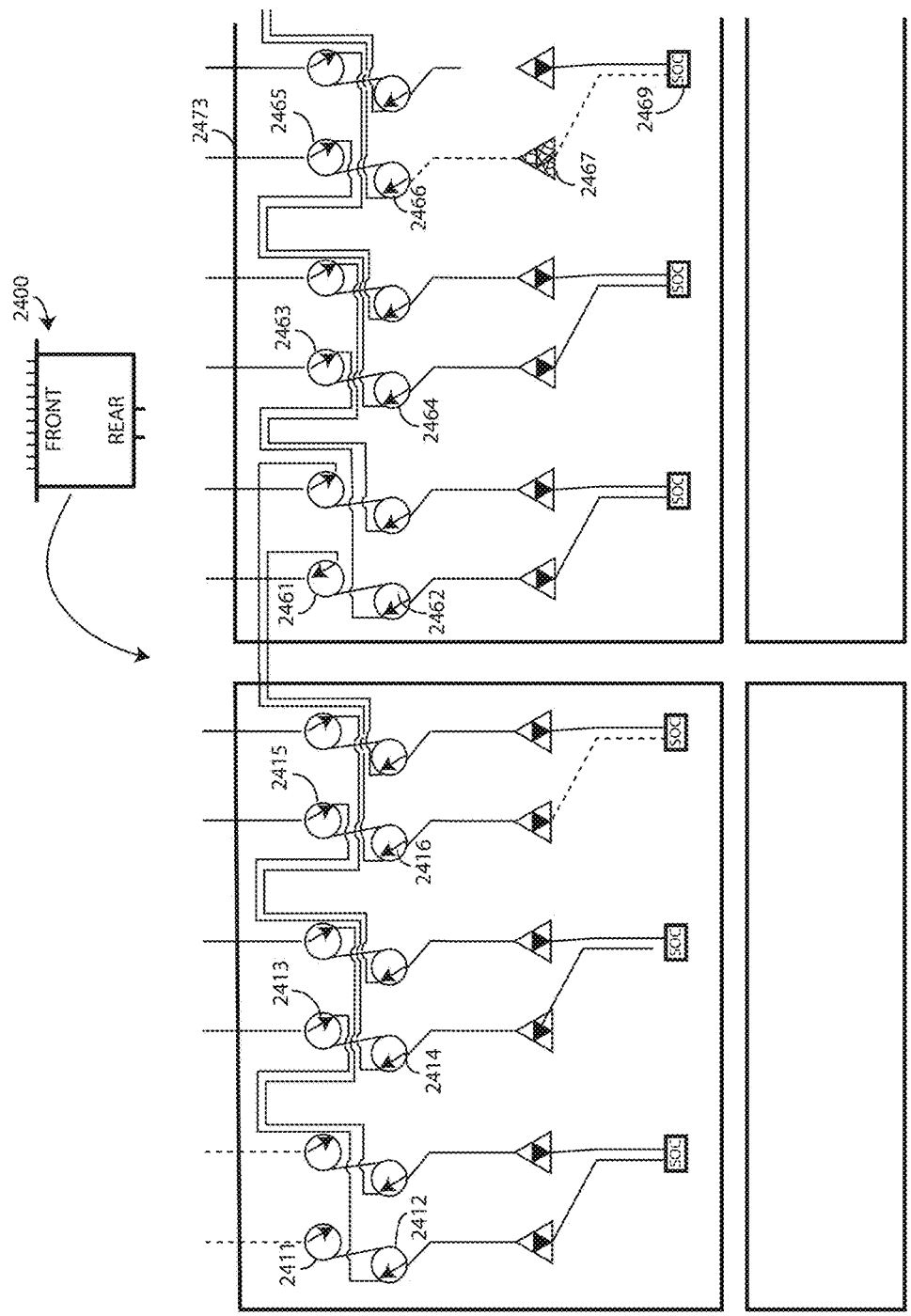
FIG. 25 illustrates the still more alternate explanatory optical subsystems of FIG. 24 when a fault condition is detected.

Turning to FIG. 25, a fault condition has occurred in photonic subassembly 2467. In one embodiment, upon this fault condition being detected by the control circuit 2269 or other logic disposed within the optical line terminal 2400, the optical switches 2411,2412,2413,2414,2415, 2416,2461, 2462,2463,2464,2465,2466 are configured to switch to overcome the fault condition. In FIG. 25, optical switches 2411,2412,2413,2414,2415,2416,2461,2462,2463,2464, 2465,2466 have switched as previously described to cause each optical subsystem to deliver signals to, and receive signals from, the port of its neighbor to the right, as indicated by the solid lines that were previously dashed in FIG. 25.

Figure 26:
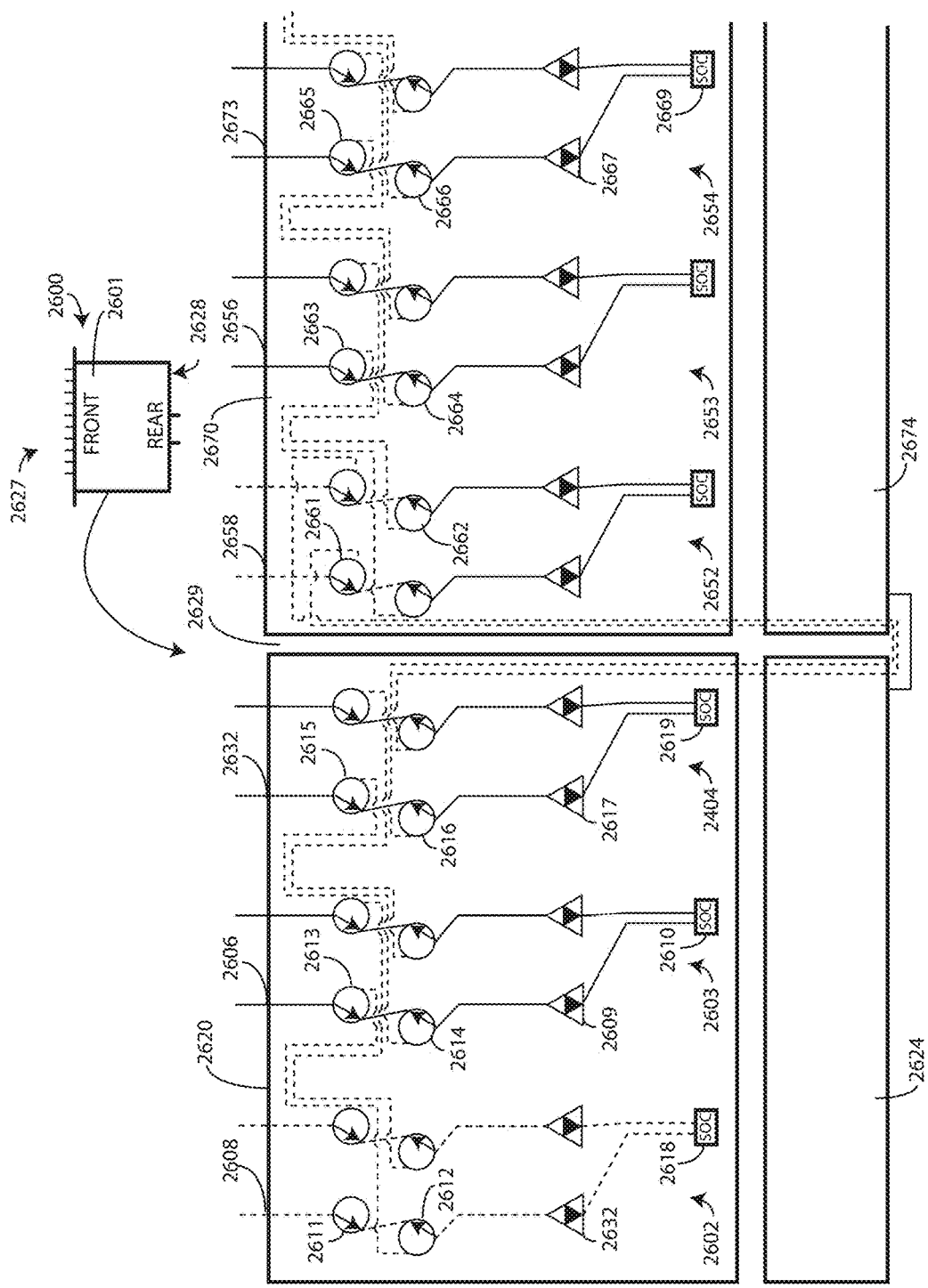
FIG. 26 illustrates still more alternate explanatory optical subsystems in accordance with one or more embodiments of the disclosure.
Figure 27:
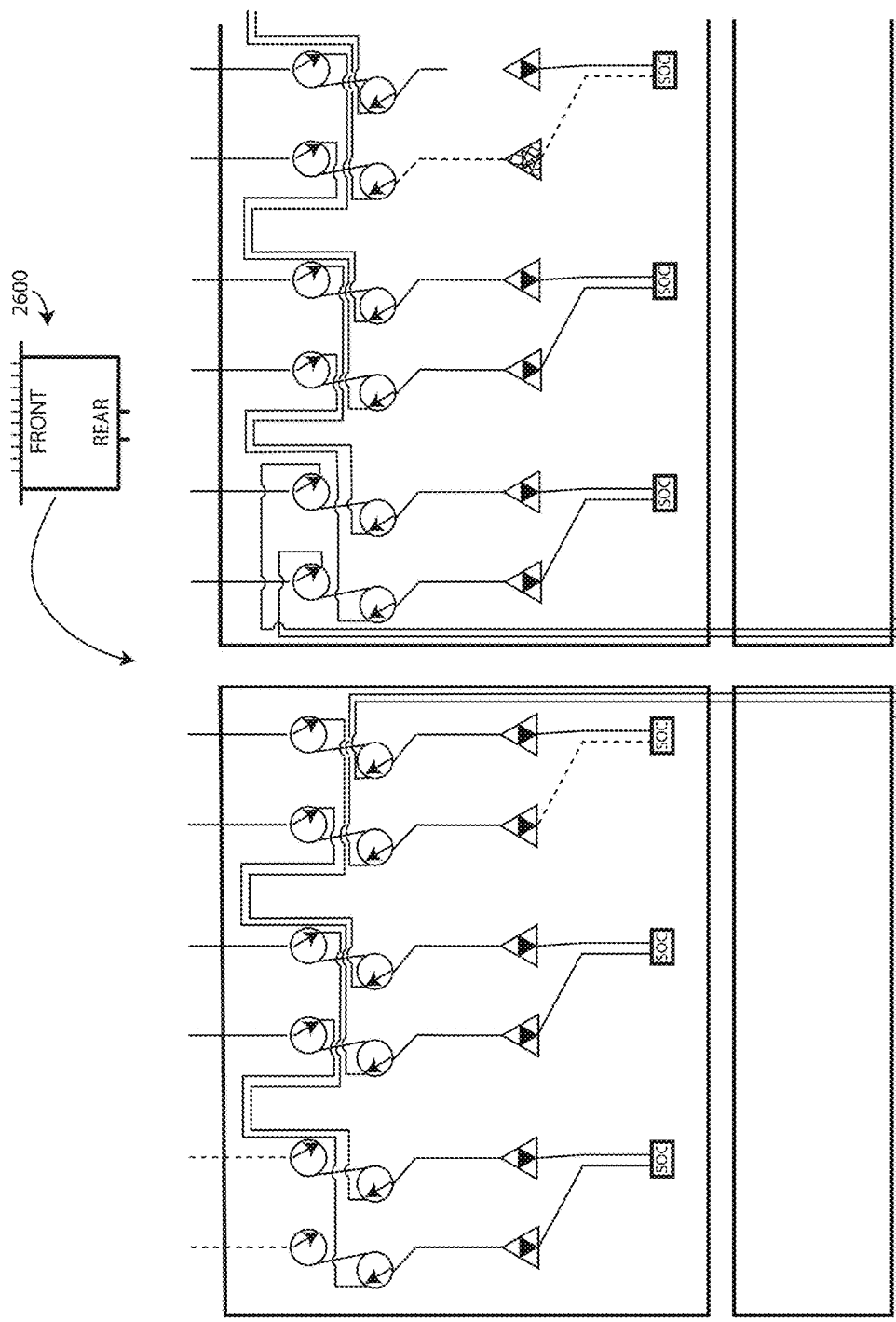
FIG. 27 illustrates the still more alternate explanatory optical subsystems of FIG. 26 when a fault condition is detected.

The embodiment shown in FIGS. 26-27 operates in exactly the same fashion as the embodiment of FIGS. 24-25. However, as shown, the optical coupler 2629 is disposed along the rear 2628 of the chassis 2601. FIG. 26 illustrates an example of a spare-for-subsystem-to-right redundancy scheme in the optical line terminal 2600, before sparing. FIG. 27 illustrates an example for spare-for-subsystem-to-right redundancy scheme in the optical line terminal 2600 after sparing. As shown, redundancy is offered during operation, not during repair.

Figure 28:
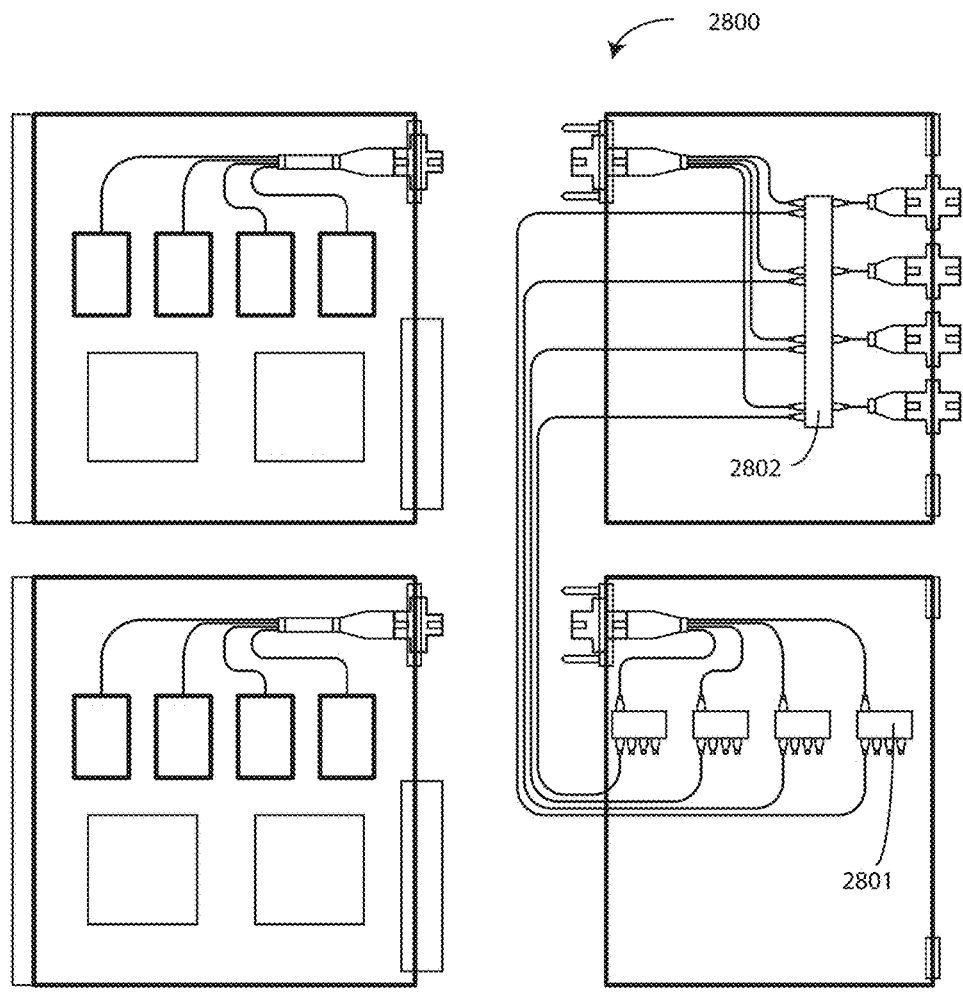
FIG. 28 illustrates explanatory optical subsystems disposed on explanatory circuit cards in accordance with one or more embodiments of the disclosure.
Figure 29:
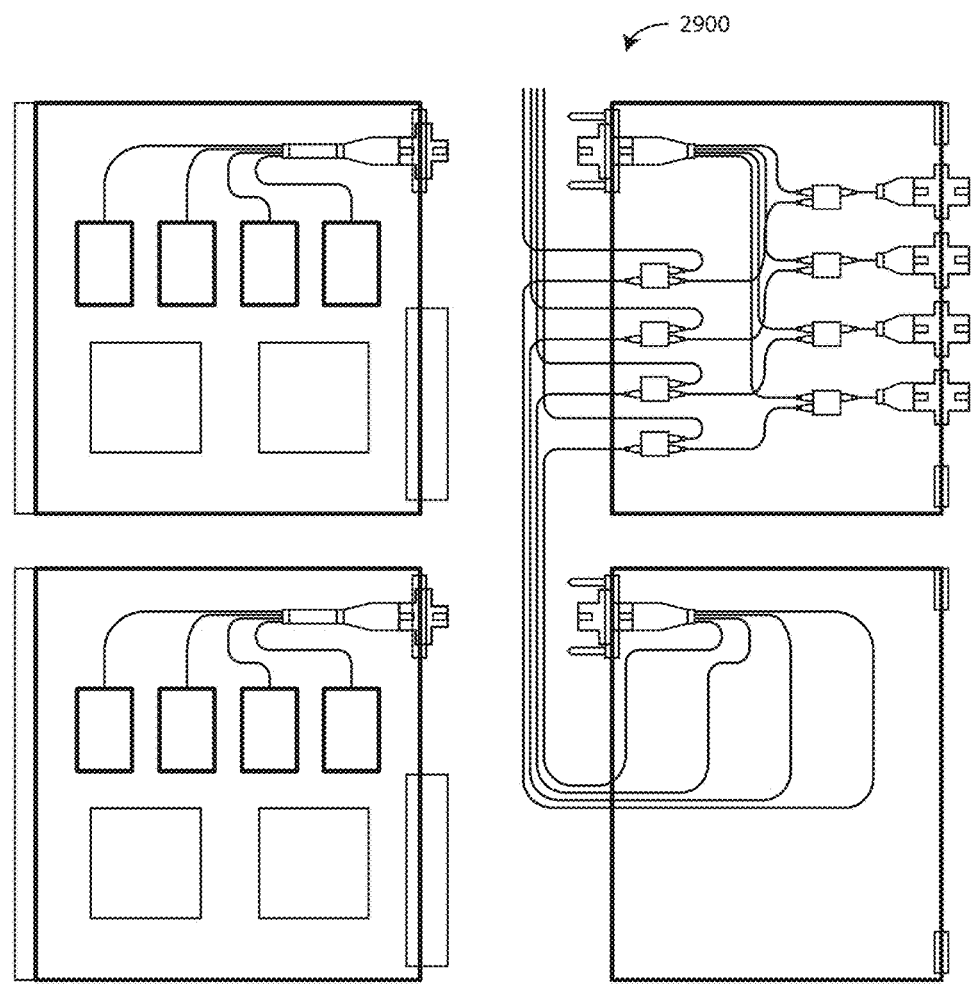
FIG. 29 illustrates alternate explanatory optical subsystems disposed on explanatory circuit cards in accordance with one or more embodiments of the disclosure.
Figure 30:
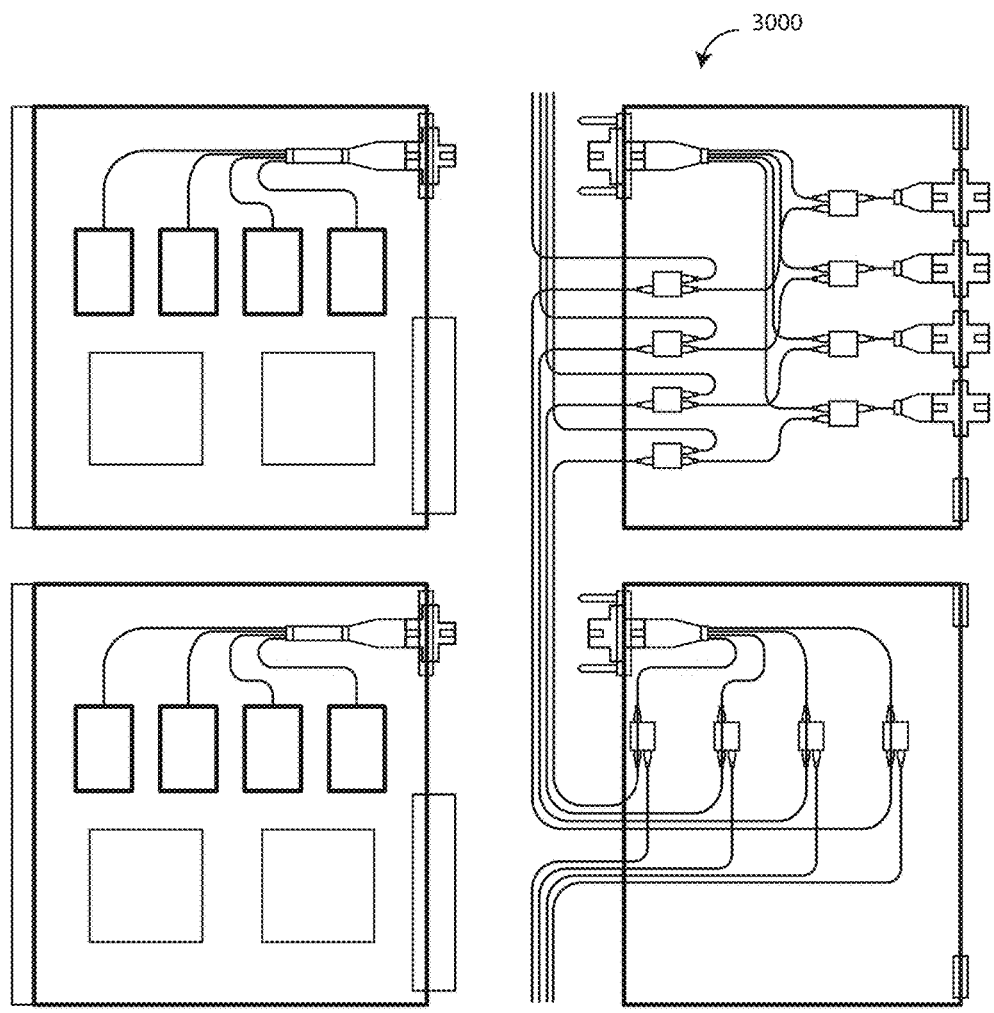
FIG. 30 illustrates still another explanatory optical subsystems disposed on explanatory circuit cards in accordance with one or more embodiments of the disclosure.
Figure 31:
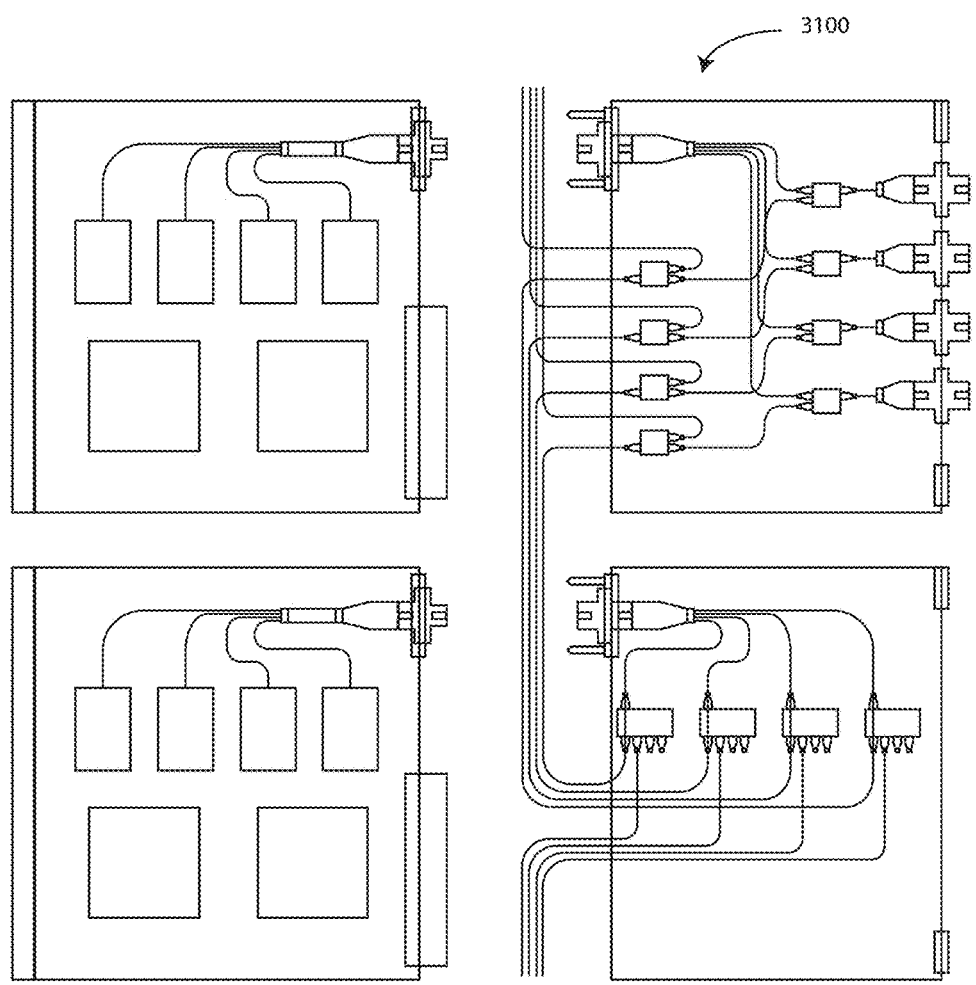
FIG. 31 illustrates still another explanatory optical subsystems disposed on explanatory circuit cards in accordance with one or more embodiments of the disclosure.

FIGS. 28-31 examples of redundancy schemes 2800, 2900,3000,3100 that may employ the disclosed techniques. It should be understood that these are examples. The approaches illustrate the potential adaptation into a chassis configuration with front or rear chassis-side optical connections. The scheme 2800 of FIG. 28 illustrates sparing between two sets of card pairs, while the schemes 2900, 3000,3100 illustrate sparing schemes between multiple sets of card pairs. As shown, optical switches can take a variety of forms. The scheme 2800 of FIG. 28 uses 1×4 switches 2801 and 4×8 switches 2802, while the schemes 2900,3000 of FIGS. 29-30 use 1×2 switches. The scheme 3100 of FIG. 31 uses a combination thereof. Other redundancy schemes will be obvious to those of ordinary skill in the art having the benefit of this disclosure.

Figure 32:
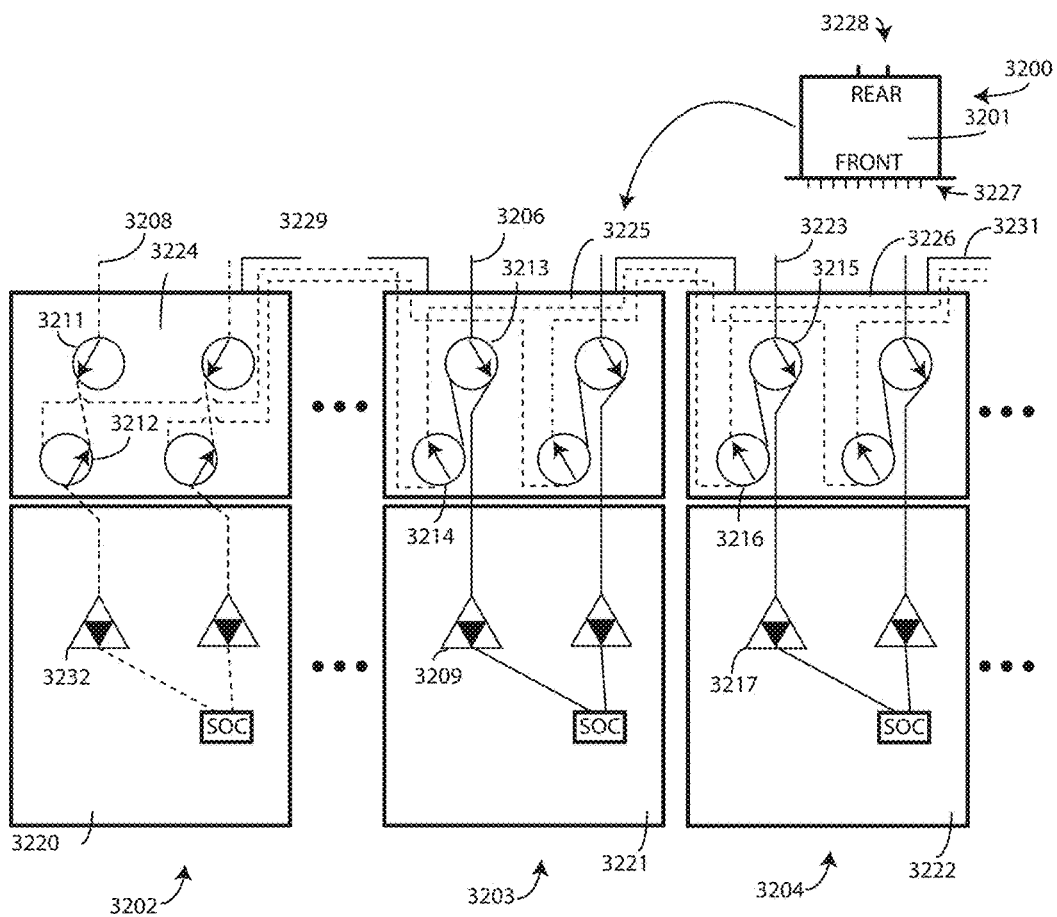
FIG. 32 illustrates still more alternate explanatory optical subsystems in accordance with one or more embodiments of the disclosure.
Figure 33:
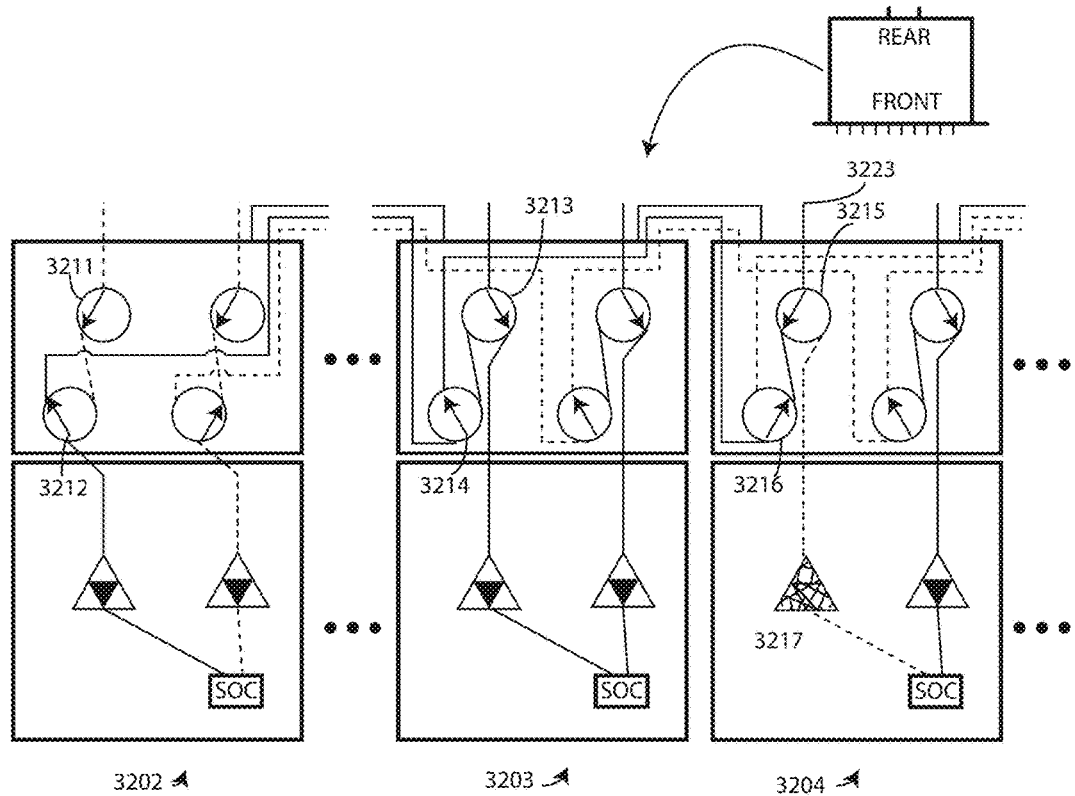
FIG. 33 illustrates the still more alternate explanatory optical subsystems of FIG. 34 when a fault condition is detected.

Turning now to FIGS. 32-33, illustrated therein is an alternate embodiment of the disclosure. In the embodiment of FIGS. 32-33, rather than providing a spare to the right, the spare optical subsystem provides the spare directly to the affected optical subsystem. Generally speaking, the scheme of providing a spare to the right (or left) is preferable because optical losses are minimized. However, there are applications in which leapfrogging one or more optical subsystems to deliver the spare from the spare optical subsystem directly to the affected optical subsystem is preferred.

Providing a spare to the right (or left), which is also known as adjacent card or adjacent subsystem sparing, has low optical losses. Further, it requires each card—or subsystem—to only carry the state information for one card—or subsystem—adjacent to it reduces memory requirements and can accelerate the execution of the sparing operation. For example, the correct state information for the spare can be pre-loaded in shadow memories. However, when providing a spare to the right (or left), all optical subsystems get into the act, i.e., switch to provide a spare. This can momentarily disrupts the operation of the various passive optical network fibers for many cards when a sparing operation is initiated.

With the embodiment of FIGS. 32-33, only one card, i.e., the faulty card, is disrupted during the sparing operation. For this reason, some network operators may prefer the embodiment of FIGS. 32-33. However, it should be noted that this embodiment can lead to higher optical loss. Additionally, this embodiment requires the spare optical subsystem to carry the state information for all other cards in the chassis. This results in a greater memory requirement and can delay the sparing operation.

Beginning with FIG. 32, illustrated therein is a schematic block diagram of components of another illustrative optical line terminal 3200 operable in a passive network in accordance with one or more embodiments of the disclosure. The optical line terminal 3200 includes a chassis 3201 and a plurality of optical subsystems 3202,3203,3204 that are disposed in the chassis 3201.

Each optical subsystem 3202,3203,3204 is operable to generate downstream optical signals, deliver downstream optical signals to a port 3206,3208,3223 of each optical subsystem 3202,3203,3204, and to receive upstream optical signals from the port 3206,3208,3223 of each optical subsystem 3202,3203,3204. Optical subsystem 3202 is a spare optical subsystem to generate spare optical signals in this embodiment.

In one embodiment, each optical subsystem 3202,3203, 3204 includes one or more optical switches. For example, in this embodiment the spare optical subsystem 3202 includes two optical switches, e.g., optical switches 3211,3212, for each photonic subassembly, e.g., photonic subassembly 3232. Similarly, each of optical subsystems 3203,3204 includes a pair of optical switches 3213,3214,3215,3216 per photonic subassembly 3209,3217.

In this embodiment, the control circuits 3210,3218,3219 and photonic subassemblies 3209,3232,3217 are all disposed on packet forwarding module circuit cards 3220,3221, 3222 inserted into the front 3227 of the chassis 3201. Optical switches 3211,3212,3213,3214,3215,3216, and ports 3206, 3208,3223 are disposed on photonic integrated circuit cards 3224,3225,3226 inserted into the rear 3228 of the chassis 3201.

The optical couplers 3229,3230,3231 again couple the circuit cards together. The optical couplers 3229,3230,3231 selectively deliver optical signals between the circuit cards based upon a state of the optical switches 3211,3212,3213, 3214,3215,3216. The optical switches 3211,3212,3213, 3214,3215,3216 are in a first state, which is the default state, in FIG. 32. They are in a second state, which occurs when a fault condition is detected, in FIG. 33. In this illustrative embodiment, the optical couplers 3229,3230,3231 are all disposed along the front 3427 of the chassis 3201.

In FIG. 32, the optical line terminal 3200 is in normal operation. No fault conditions exist. Accordingly, the optical switches 3211,3212,3213,3214,3215,3216 are all in default states. Spare optical subsystem 3202 is not needed in normal operation, and is thus in an idle state. No optical signals pass through the optical couplers 3229,3230,3231, as indicated by the dashed lines.

Turning to FIG. 33, a fault condition has occurred in photonic subassembly 3217. In one embodiment, upon this fault condition being detected, the optical switches 3211, 3212,3213,3214,3215,3216 are configured to switch to overcome the fault condition. In FIG. 32, optical switches 3212,3214,3215,3216 have switched to deliver and receive optical signals to and from optical subsystem 3202 through port 3223 of optical subsystem 3204 overcome the fault condition occurring in photonic subassembly 3217. Optical subsystem 3203 operates normally. Thus, in this embodiment, the faulty optical subsystem, i.e., optical subsystem 3204, and the spare optical subsystem, optical subsystem 3202, are separated by optical subsystem 3203. However, the spare signal is delivered across optical subsystem 3203 to optical subsystem 3204.

Figure 34:
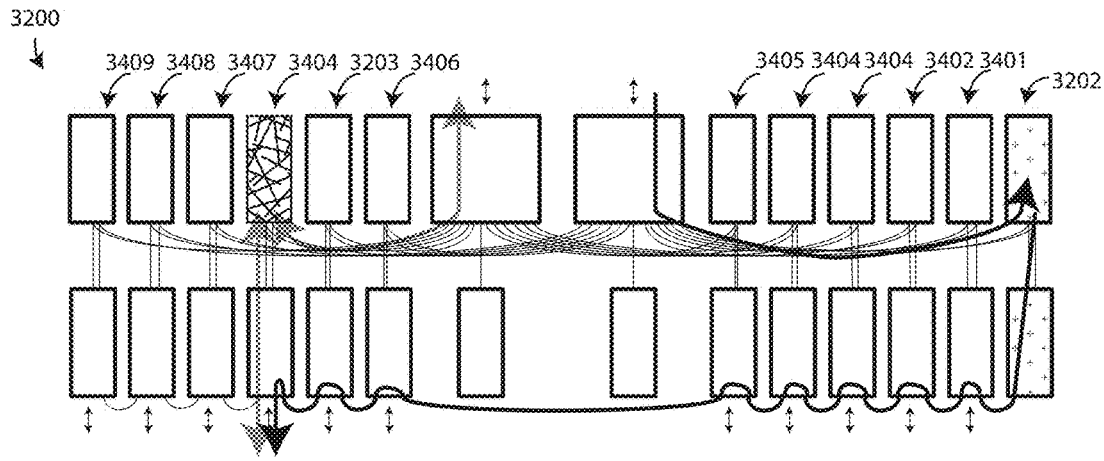
FIG. 34 illustrates an explanatory data flow using the optical subsystems of FIG. 35.

The signal flow for this optical line terminal 3200 is shown in FIG. 34. Turning now to FIG. 34, a plurality of optical subsystems 3401,3402,3403,3404,3405,3406,3203, 3204,3407, 3408,3409 are arranged sequentially in a series. Optical subsystem 3401 is the first optical subsystem of the series, while optical subsystem 3402 is the second optical subsystem. Optical subsystem 3403 is the third, while optical subsystem 3404 is the fourth, and so forth. The spare optical subsystem 3202 is also included. In this illustrative embodiment, the spare optical subsystem 3202 is separated from the optical subsystem 3404 experiencing the fault condition by optical subsystems 3401,3402,3403,3404, 3405,3406,3203. When the optical switches act, the spare optical subsystem 3202 delivers downstream optical signals to the Mth optical subsystem, which is experiencing the fault condition. Thus, inclusion of the spare optical subsystem 3202, in addition to it being switched in to deliver spare optical signals to the faulty optical subsystem 3204 directly to overcome the fault condition. Optical subsystems 3401, 3402,3403,3404,3405,3406,3203,3407,3408,3409 operate normally.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general-purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An optical line terminal (OLT) operable in a passive optical network (PON), the optical line terminal comprising:
    a chassis; and
    a plurality of optical subsystems disposed within the chassis, each optical subsystem operable to generate optical signals for delivery to a port of the each optical subsystem and comprising one or more optical switches, wherein the plurality of optical subsystems comprises N optical subsystems arranged in a series from 1 to N;
    the one or more optical switches to, when a fault condition is detected at an Mth optical subsystem in the N optical subsystems, the one or more optical switches are configured to cause delivery of spare optical signals from a subsystem X in the N optical subsystems to an output port of the Mth optical subsystem and to cause remaining optical subsystems in the N optical subsystems to each deliver optical signals generated thereon to another optical subsystem other than the Mth optical subsystem, thereby selectively removing connection of the Mth optical subsystem from the remaining N optical subsystems, wherein M is less than N.

2. The optical line terminal of claim 1, wherein the plurality of optical subsystems are disposed on circuit cards, the optical line terminal further comprising optical couplers coupling the circuit cards together, the optical couplers to selectively deliver the optical signals between the circuit cards based upon a state of the one or more optical switches.

3. The optical line terminal of claim 2, wherein each optical coupler couples a pair of adjacent circuit cards together.

4. The optical line terminal of claim 2, wherein the optical couplers are disposed only along a front side of the chassis.

5. The optical line terminal of claim 2, wherein the optical couplers are disposed only along a rear side of the chassis.

6. The optical line terminal of claim 2, wherein at least two optical subsystems are disposed on one circuit card.

7. The optical line terminal of claim 1, wherein the each optical subsystem is disposed on a single circuit card.

8. The optical line terminal of claim 1, wherein the each optical subsystem comprises a first portion disposed on a first circuit card and a second portion disposed on a second circuit card.

9. The optical line terminal of claim 8, wherein the first circuit card is inserted into one of a front of the chassis or a rear of the chassis, and the second circuit card is inserted into another of the front of the chassis or the rear of the chassis.

10. The optical line terminal of claim 1, wherein the one or more optical switches are configured to switch automatically when the fault condition is detected.

11. An optical line terminal, comprising:
    a chassis;
    N optical subsystems disposed within the chassis, the N optical subsystems each assigned a value from 1 to N in a series, and each optical subsystem of the N optical subsystems comprising: a phototransmitter to deliver optical signals to a port of the respective optical subsystem; and
    one or more optical switches;
    the one or more optical switches to, upon sensing a fault condition at a Mth optical subsystem in the N optical subsystems, switch to:
    deliver spare optical signals from a subsystem X in the N optical subsystems to an output port of the Mth optical subsystem; and
    cause remaining optical subsystems in the N optical subsystems to each deliver optical signals generated thereon to another optical subsystem other than the Mth optical subsystem, thereby selectively removing connection of the Mth optical subsystem from remaining ones of the N optical subsystem, wherein M is less than N.

12. The optical line terminal of claim 11, wherein the each optical subsystem is disposed on one or more circuit cards, the optical line terminal further comprising one or more passive optical couplers coupling adjacent circuit cards together, the one or more passive optical couplers to selectively deliver the optical signals between the adjacent circuit cards based upon a state of the one or more optical switches, wherein the one or more passive optical couplers are disposed exterior of the chassis.

* * * * *